(12) United States Patent
Bone et al.

(10) Patent No.: US 10,527,819 B2
(45) Date of Patent: Jan. 7, 2020

(54) OCULAR OPTICAL SYSTEM

(71) Applicant: Genius Electronic Optical Co., Ltd., Taichung (TW)

(72) Inventors: Matthew Bone, Fujian (CN); Baina Chen, Fujian (CN); Yanbin Chen, Fujian (CN)

(73) Assignee: Genius Electronic Optical Co., Ltd., Taichung (TW)

( * ) Notice: Subject to any disclaimer, the term of this patent is extended or adjusted under 35 U.S.C. 154(b) by 0 days.

(21) Appl. No.: 15/414,640

(22) Filed: Jan. 25, 2017

(65) Prior Publication Data
US 2018/0196229 A1 Jul. 12, 2018

(30) Foreign Application Priority Data

Jan. 11, 2017 (CN) .......................... 2017 1 0021192

(51) Int. Cl.
*G02B 25/00* (2006.01)
*G02B 9/34* (2006.01)

(52) U.S. Cl.
CPC .............. *G02B 9/34* (2013.01); *G02B 25/001* (2013.01)

(58) Field of Classification Search
CPC .... G02B 13/004; G02B 27/0025; G02B 9/34; G02B 25/001; G02B 27/2228; G02B 13/18; G02B 9/56
See application file for complete search history.

(56) References Cited

U.S. PATENT DOCUMENTS

| | | | | |
|---|---|---|---|---|
| 5,926,321 A * | 7/1999 | Shikama | .............. | G02B 25/001 359/630 |
| 5,986,816 A * | 11/1999 | Shikama | .............. | G02B 25/001 359/644 |
| 2014/0218806 A1* | 8/2014 | Ishizuka | ................ | G02B 13/22 359/644 |
| 2016/0154216 A1* | 6/2016 | Liao | ...................... | G02B 13/004 348/335 |
| 2016/0356987 A1* | 12/2016 | Liu | ...................... | G02B 13/004 |

* cited by examiner

*Primary Examiner* — Alicia M Harrington
(74) *Attorney, Agent, or Firm* — Winston Hsu

(57) ABSTRACT

An ocular optical system includes a first lens element of a display-side surface with a convex portion in a vicinity of its periphery, a second lens element of positive refractive power and an eye-side surface with a concave portion in a vicinity of its periphery, a third lens element of negative refractive power and an display-side surface with a concave portion in a vicinity of an optical-axis, or a fourth lens element of an display-side surface with a concave portion in a vicinity of the optical-axis.

20 Claims, 28 Drawing Sheets

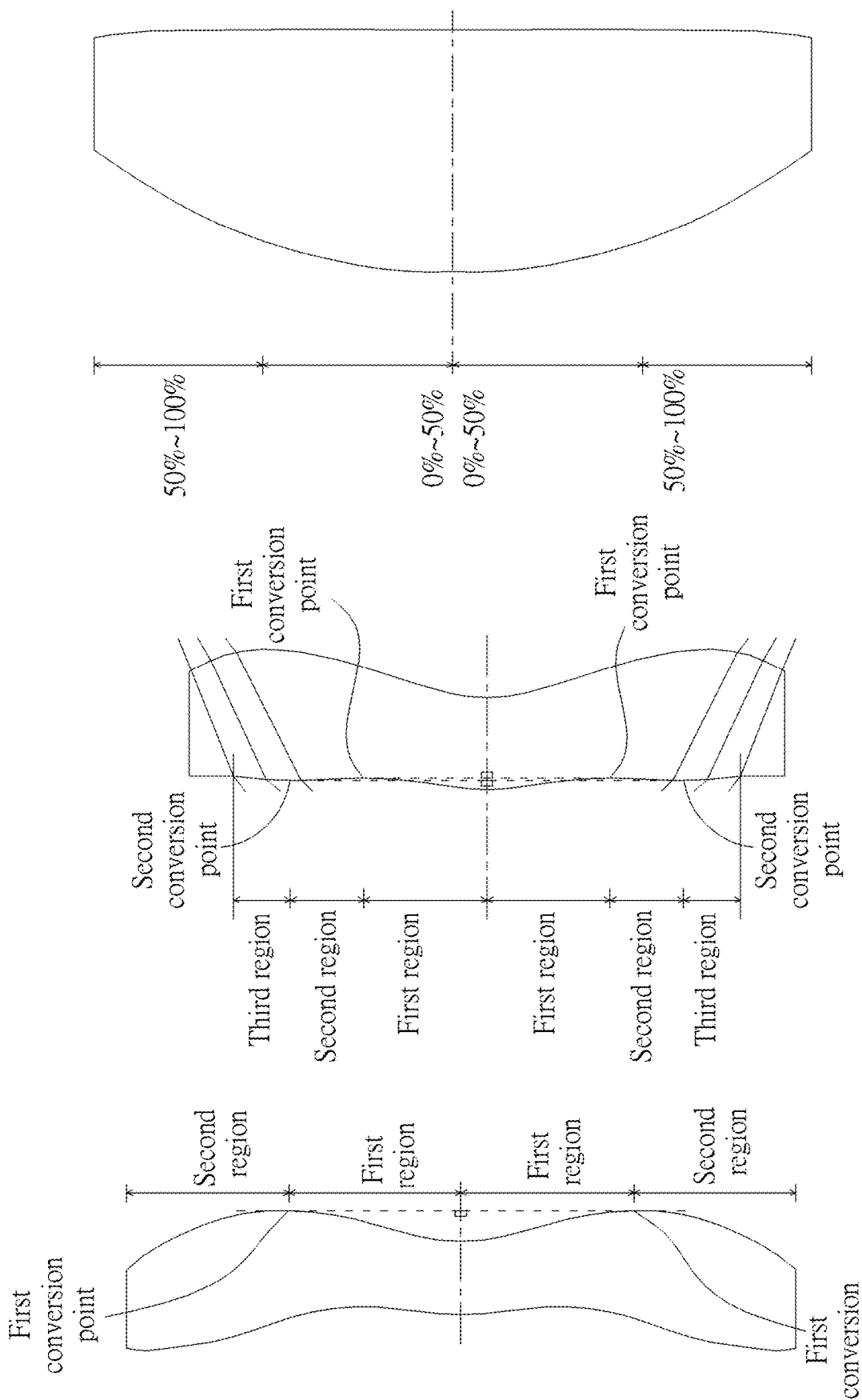

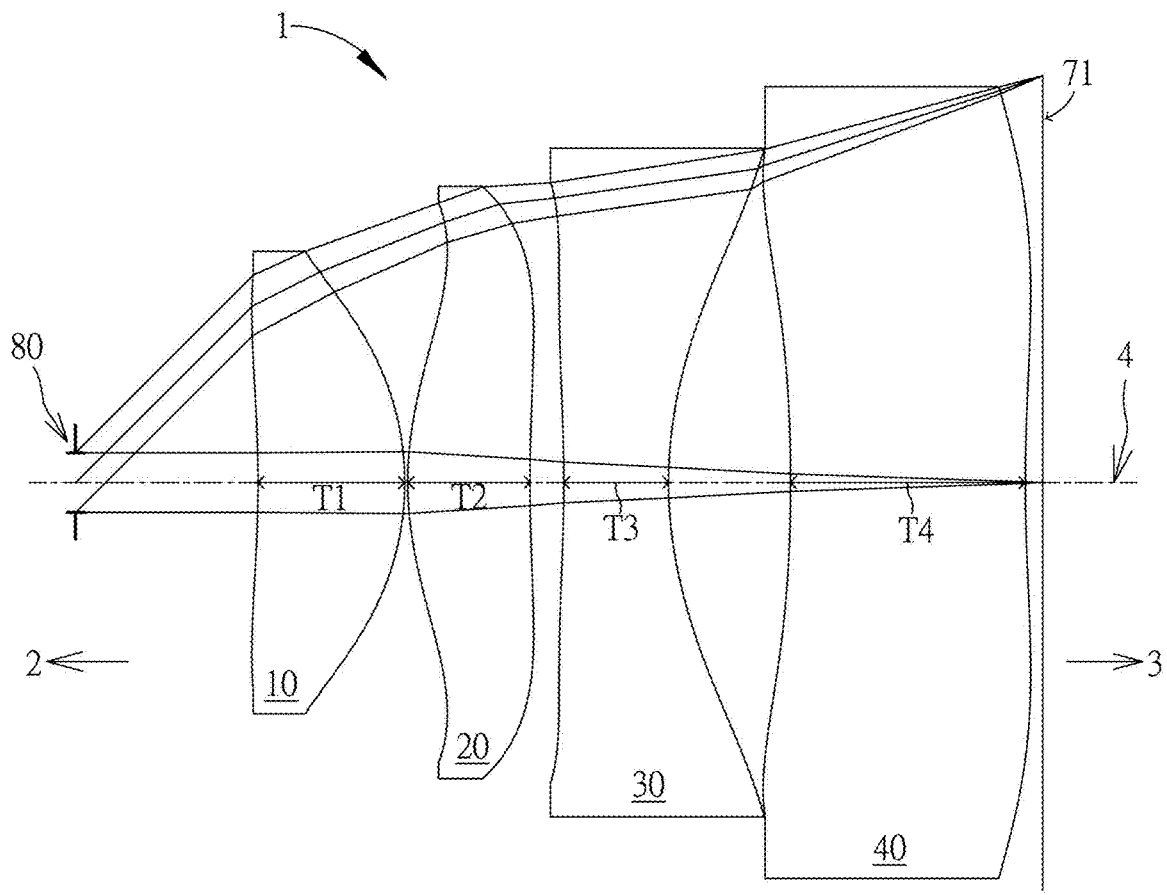
FIG. 9
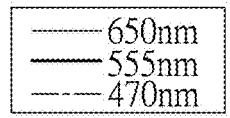
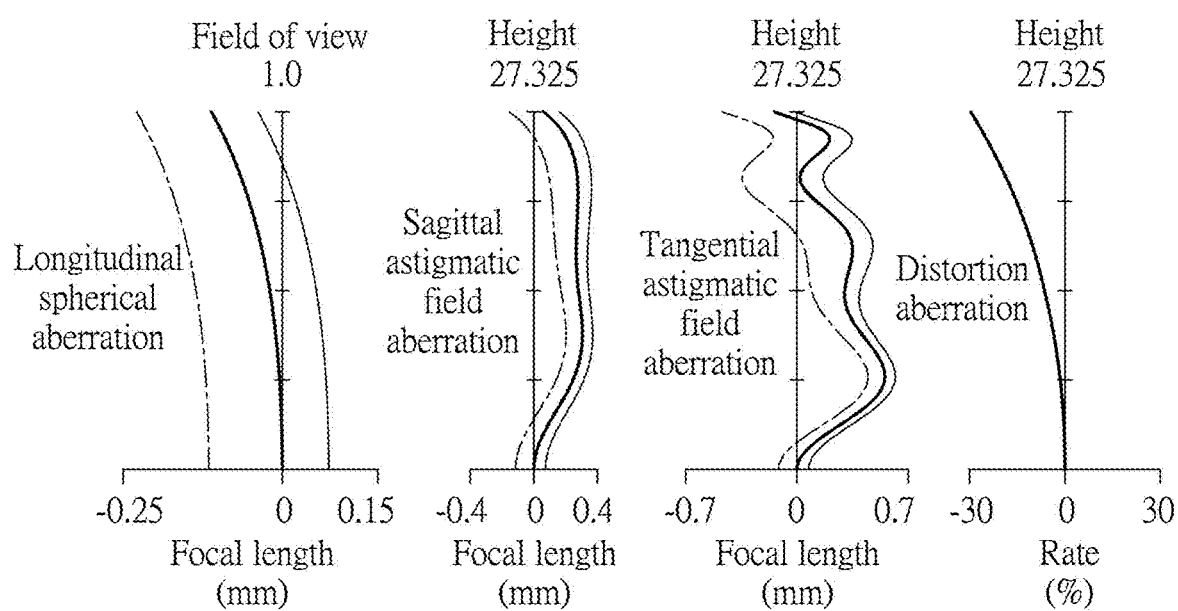
FIG. 10A   FIG. 10B   FIG. 10C   FIG. 10D

| First Example | | | | | | | |
|---|---|---|---|---|---|---|---|
| EFL=36.4134 mm, ω=45.0008 Degrees, TTL=44.8263 mm, Fno=9.1025 | | | | | | | |
| No. | | Curvature Radius | Lens Thickness Air Gap | | Refractive Index | Abbe No. | Focal Length | Semi-Diameter |
| | Observer's Pupil | | 11.7579 | | | | | 2.0000 |
| 11 | First Lens | -40.2799 | 7.4654 | T1 | 1.5445 | 55.9870 | 43.7217 | 13.0027 |
| 12 | | -15.9407 | 0.0199 | G12 | | | | 14.0924 |
| 21 | Second Lens | 20.2708 | 6.2212 | T2 | 1.5445 | 55.9870 | 49.0373 | 17.5280 |
| 22 | | 75.0666 | 1.8293 | G23 | | | | 18.4199 |
| 31 | Third Lens | -280.6702 | 5.3324 | T3 | 1.6606 | 20.4012 | -36.7722 | 19.0643 |
| 32 | | 26.7939 | 20.1373 | G34 | | | | 20.7706 |
| 41 | Fourth Lens | -132.7441 | 3.0153 | T4 | 1.5348 | 55.6899 | -245.6878 | 26.4691 |
| 42 | | 13108.1629 | 0.8057 | G4D | | | | 27.1582 |
| 71 | Display Screen | Infinity | 0.0000 | | | | | 27.3678 |

FIG. 23

| No. | K | a2 | a4 | a6 | a8 |
|---|---|---|---|---|---|
| 11 | 0.0000E+00 | 0.0000E+00 | 5.2214E-05 | -1.8902E-08 | 0.0000E+00 |
| 12 | -4.3597E+00 | 0.0000E+00 | -1.0360E-04 | 3.1631E-07 | 0.0000E+00 |
| 21 | -1.5292E-01 | 0.0000E+00 | -5.7172E-05 | -6.0071E-08 | 0.0000E+00 |
| 22 | 0.0000E+00 | 0.0000E+00 | -3.2279E-06 | -9.4111E-08 | 0.0000E+00 |
| 31 | 0.0000E+00 | 0.0000E+00 | 4.5784E-05 | -9.2395E-08 | 0.0000E+00 |
| 32 | 0.0000E+00 | 0.0000E+00 | -3.5565E-06 | -3.8485E-08 | 0.0000E+00 |
| 41 | 0.0000E+00 | 0.0000E+00 | -3.9905E-06 | 5.4295E-09 | 5.1956E-12 |
| 42 | 0.0000E+00 | 0.0000E+00 | -4.4945E-07 | 4.9301E-10 | 0.0000E+00 |

| No. | a10 | a12 | a14 | a16 |
|---|---|---|---|---|
| 11 | 0.0000E+00 | 0.0000E+00 | 0.0000E+00 | 0.0000E+00 |
| 12 | 0.0000E+00 | 0.0000E+00 | 0.0000E+00 | 0.0000E+00 |
| 21 | 0.0000E+00 | 0.0000E+00 | 0.0000E+00 | 0.0000E+00 |
| 22 | 0.0000E+00 | 0.0000E+00 | 0.0000E+00 | 0.0000E+00 |
| 31 | 0.0000E+00 | 0.0000E+00 | 0.0000E+00 | 0.0000E+00 |
| 32 | 0.0000E+00 | 0.0000E+00 | 0.0000E+00 | 0.0000E+00 |
| 41 | 0.0000E+00 | 0.0000E+00 | 0.0000E+00 | 0.0000E+00 |
| 42 | 0.0000E+00 | 0.0000E+00 | 0.0000E+00 | 0.0000E+00 |

FIG. 24

| Second Example ||||||||
|---|---|---|---|---|---|---|---|
| EFL=38.8114 mm, ω=45.0009 Degrees, TTL=52.6607 mm, Fno=9.6962 ||||||||
| No. | | Curvature Radius | Lens Thickness Air Gap | | Refractive Index | Abbe No. | Focal Length | Semi-Diameter |
| | Observer's Pupil | | 12.2465 | | | | | 2.0000 |
| 11 | First Lens | -79.1411 | 9.8492 | T1 | 1.5445 | 55.9870 | 43.3402 | 13.9275 |
| 12 | | -18.9758 | 0.1969 | G12 | | | | 15.5320 |
| 21 | Second Lens | 22.9470 | 8.2071 | T2 | 1.5445 | 55.9870 | 51.4834 | 18.7958 |
| 22 | | 110.5358 | 2.2671 | G23 | | | | 19.8918 |
| 31 | Third Lens | -100.5194 | 7.0351 | T3 | 1.6606 | 20.4012 | -32.8830 | 20.1897 |
| 32 | | 28.4819 | 8.1850 | G34 | | | | 22.4570 |
| 41 | Fourth Lens | -113.8117 | 15.7593 | T4 | 1.5348 | 55.6899 | -100.6315 | 22.4785 |
| 42 | | 107.0353 | 1.1611 | G4D | | | | 26.5946 |
| 71 | Display Screen | Infinity | 0.0000 | | | | | 27.3695 |

FIG. 25

| No. | K | a2 | a4 | a6 | a8 |
|---|---|---|---|---|---|
| 11 | 0.0000E+00 | 0.0000E+00 | 2.3852E-05 | 2.5642E-09 | -1.5003E-14 |
| 12 | -4.9094E+00 | 0.0000E+00 | -8.8251E-05 | 2.0074E-07 | -4.2354E-14 |
| 21 | -2.1549E-01 | 0.0000E+00 | -5.0730E-05 | -1.6109E-08 | 1.2899E-14 |
| 22 | 0.0000E+00 | 0.0000E+00 | -1.6959E-05 | -3.7488E-08 | 2.9470E-14 |
| 31 | 0.0000E+00 | 0.0000E+00 | 2.7035E-05 | -4.9155E-08 | 1.8266E-15 |
| 32 | 0.0000E+00 | 0.0000E+00 | -9.2150E-06 | -1.7130E-08 | 8.5899E-16 |
| 41 | 0.0000E+00 | 0.0000E+00 | -1.2533E-05 | 3.7021E-08 | -1.6146E-11 |
| 42 | 0.0000E+00 | 0.0000E+00 | -1.6884E-05 | 9.3500E-09 | 4.1483E-15 |

| No. | a10 | a12 | a14 | a16 |
|---|---|---|---|---|
| 11 | -4.9213E-17 | -7.8631E-19 | -2.7229E-21 | 2.2119E-24 |
| 12 | 1.5348E-16 | 7.7568E-19 | 2.5138E-21 | 7.1364E-24 |
| 21 | 9.5112E-18 | 3.4446E-20 | 2.1062E-22 | 7.2988E-25 |
| 22 | 4.0798E-17 | -1.5342E-21 | -6.2030E-23 | -3.2065E-25 |
| 31 | 9.5525E-18 | 2.3647E-20 | 9.6441E-23 | 3.2045E-25 |
| 32 | 2.6468E-18 | 5.7933E-21 | 1.2895E-23 | 2.1903E-26 |
| 41 | -3.7357E-17 | -8.3278E-20 | -1.7140E-22 | 3.5027E-25 |
| 42 | 2.5886E-18 | -2.9203E-21 | -1.8868E-24 | -2.3252E-26 |

FIG. 26

| Third Example | | | | | | | |
|---|---|---|---|---|---|---|---|
| EFL=28.01260 mm, ω=45.0020 Degrees, TTL=40.0337 mm, Fno=6.9568 | | | | | | | |
| No. | | Curvature Radius | Lens Thickness Air Gap | | Refractive Index | Abbe No. | Focal Length | Semi-Diameter |
| | Observer's Pupil | | 9.3089 | | | | | 2.0000 |
| 11 | First Lens | -46.4593 | 9.9438 | T1 | 1.5445 | 55.9870 | 37.4649 | 10.7962 |
| 12 | | -15.2450 | 0.0396 | G12 | | | | 13.2555 |
| 21 | Second Lens | 18.9121 | 8.2713 | T2 | 1.5445 | 55.9870 | 43.5238 | 17.1377 |
| 22 | | 79.1975 | 1.5731 | G23 | | | | 17.7446 |
| 31 | Third Lens | -312.7226 | 7.0946 | T3 | 1.6606 | 20.4012 | -32.1864 | 17.5014 |
| 32 | | 23.0189 | 8.0507 | G34 | | | | 17.7920 |
| 41 | Fourth Lens | -500.1871 | 1.4998 | T4 | 1.5348 | 55.6899 | -70.2188 | 19.6290 |
| 42 | | 40.6468 | 3.5608 | G4D | | | | 19.4189 |
| 71 | Display Screen | Infinity | 0.0000 | | | | | 18.9177 |

FIG. 27

| No. | K | a2 | a4 | a6 | a8 |
|---|---|---|---|---|---|
| 11 | 0.0000E+00 | 0.0000E+00 | 6.2056E-05 | -8.1247E-09 | -2.1588E-10 |
| 12 | -4.1477E+00 | 0.0000E+00 | -1.1042E-04 | 3.5780E-07 | -3.2358E-11 |
| 21 | -9.5577E-02 | 0.0000E+00 | -4.4455E-05 | -9.4191E-08 | 1.0025E-12 |
| 22 | 0.0000E+00 | 0.0000E+00 | -1.0835E-05 | -1.1606E-07 | 6.7611E-12 |
| 31 | 0.0000E+00 | 0.0000E+00 | 4.2082E-05 | -9.7196E-08 | -4.7960E-12 |
| 32 | 0.0000E+00 | 0.0000E+00 | 9.1406E-06 | -5.3414E-08 | -2.0941E-11 |
| 41 | 0.0000E+00 | 0.0000E+00 | 4.6466E-06 | 1.1781E-08 | 2.3985E-11 |
| 42 | 0.0000E+00 | 0.0000E+00 | -2.3237E-05 | 5.5064E-08 | -1.1413E-10 |

| No. | a10 | a12 | a14 | a16 |
|---|---|---|---|---|
| 11 | -1.4694E-12 | -3.7032E-15 | 1.5874E-17 | 1.2737E-19 |
| 12 | -5.8102E-14 | -3.4865E-16 | -3.9872E-18 | -4.1497E-20 |
| 21 | -2.8226E-14 | -1.0333E-16 | -2.7236E-19 | -6.6385E-22 |
| 22 | 4.1672E-14 | 1.0416E-16 | 1.8229E-19 | 1.4806E-22 |
| 31 | -2.0743E-14 | -3.8083E-17 | 3.4893E-20 | 5.6282E-22 |
| 32 | -1.0434E-13 | -4.1865E-17 | 3.0595E-20 | 2.3280E-22 |
| 41 | 2.6495E-14 | 3.6486E-17 | 1.6834E-19 | 7.2582E-22 |
| 42 | -1.2029E-13 | 3.5041E-16 | 2.3801E-19 | -1.0762E-21 |

FIG. 28

| \multicolumn{7}{c}{Fourth Example} |
| EFL=36.7209 mm, | ω=45.0004 Degrees, | TTL=47.9270 mm, | Fno= 9.2018 |

| No. | | Curvature Radius | Lens Thickness Air Gap | | Refractive Index | Abbe No. | Focal Length | Semi-Diameter |
|---|---|---|---|---|---|---|---|---|
| | Observer's Pupil | | 11.1417 | | | | | 2.0000 |
| 11 | First Lens | -40.0782 | 9.1148 | T1 | 1.5445 | 55.9870 | 46.7451 | 12.2677 |
| 12 | | -16.8148 | 0.0556 | G12 | | | | 14.2298 |
| 21 | Second Lens | 21.3006 | 7.9959 | T2 | 1.5445 | 55.9870 | 51.4244 | 18.3756 |
| 22 | | 77.2387 | 1.8747 | G23 | | | | 19.3309 |
| 31 | Third Lens | -108.2161 | 6.4889 | T3 | 1.6606 | 20.4012 | -39.4085 | 19.3068 |
| 32 | | 35.0968 | 0.6385 | G34 | | | | 22.1932 |
| 41 | Fourth Lens | 70.0259 | 2.5254 | T4 | 1.5348 | 55.6899 | -959.0069 | 24.0950 |
| 42 | | 60.8397 | 19.2332 | G4D | | | | 23.6245 |
| 71 | Display Screen | Infinity | 0.0000 | | | | | 27.6235 |

FIG. 29

| No. | K | a2 | a4 | a6 | a8 |
|---|---|---|---|---|---|
| 11 | 0.0000E+00 | 0.0000E+00 | 5.3054E-05 | -6.3965E-08 | -1.2976E-11 |
| 12 | -4.4560E+00 | 0.0000E+00 | -9.7870E-05 | 2.5167E-07 | -8.5806E-12 |
| 21 | -2.1463E-01 | 0.0000E+00 | -5.7578E-05 | -6.0422E-10 | 4.4952E-11 |
| 22 | 0.0000E+00 | 0.0000E+00 | -4.7052E-06 | -5.8809E-08 | -4.9245E-12 |
| 31 | 0.0000E+00 | 0.0000E+00 | 3.0610E-05 | -7.3891E-08 | -1.8710E-11 |
| 32 | 0.0000E+00 | 0.0000E+00 | -9.9927E-06 | -2.2929E-08 | -2.3951E-12 |
| 41 | 0.0000E+00 | 0.0000E+00 | 8.0484E-06 | 9.4629E-09 | 9.0438E-12 |
| 42 | 0.0000E+00 | 0.0000E+00 | -2.0846E-06 | 3.2110E-08 | 0.0000E+00 |

| No. | a10 | a12 | a14 | a16 |
|---|---|---|---|---|
| 11 | 6.2066E-13 | 2.3420E-15 | 0.0000E+00 | -9.6758E-21 |
| 12 | 2.9060E-15 | -4.8723E-16 | 1.4906E-18 | 2.3583E-20 |
| 21 | 2.6467E-14 | 9.2212E-17 | -2.0389E-19 | -2.1653E-21 |
| 22 | 3.3388E-14 | -3.5008E-18 | -1.4023E-19 | -3.8935E-22 |
| 31 | -5.1697E-14 | -4.7528E-17 | 9.9765E-20 | 4.5347E-22 |
| 32 | 8.8260E-15 | 1.3398E-17 | 1.3838E-20 | -2.0779E-23 |
| 41 | -1.8801E-15 | -9.3670E-18 | -1.6886E-20 | -1.3459E-23 |
| 42 | -9.7822E-16 | -3.7030E-18 | -1.9235E-20 | -5.0454E-23 |

FIG. 30

| Fifth Example ||||||||
|---|---|---|---|---|---|---|---|
| EFL=42.4611 mm, ω=45.0002 Degrees, TTL=44.7710 mm, Fno=10.5796 ||||||||
| No. | | Curvature Radius | Lens Thickness Air Gap || Refractive Index | Abbe No. | Focal Length | Semi-Diameter |
| | Observer's Pupil | | 10.4116 || | | | 2.0000 |
| 11 | First Lens | -53.1538 | 6.6822 | T1 | 1.5445 | 55.9870 | 44.9580 | 12.0777 |
| 12 | | -17.5035 | 0.0510 | G12 | | | | 13.0479 |
| 21 | Second Lens | 19.5118 | 5.5684 | T2 | 1.5445 | 55.9870 | 49.6439 | 15.8800 |
| 22 | | 63.0855 | 1.8249 | G23 | | | | 16.9972 |
| 31 | Third Lens | 859.4923 | 4.7729 | T3 | 1.6606 | 20.4012 | -45.0378 | 17.6213 |
| 32 | | 28.6926 | 14.8856 | G34 | | | | 20.0516 |
| 41 | Fourth Lens | -24.1349 | 6.7600 | T4 | 1.5348 | 55.6899 | -26.6371 | 21.8219 |
| 42 | | 38.1656 | 4.2260 | G4D | | | | 24.6505 |
| 71 | Display Screen | Infinity | 0.0000 || | | | 26.8439 |

FIG. 31

| No. | K | a2 | a4 | a6 | a8 |
|---|---|---|---|---|---|
| 11 | 0.0000E+00 | 0.0000E+00 | 5.9255E-05 | -1.8044E-08 | -1.7463E-10 |
| 12 | -6.0736E+00 | 0.0000E+00 | -1.1636E-04 | 3.9496E-07 | -6.0231E-11 |
| 21 | -1.0717E-01 | 0.0000E+00 | -5.5329E-05 | -2.8150E-08 | -3.8629E-11 |
| 22 | 0.0000E+00 | 0.0000E+00 | 1.1892E-05 | -1.2183E-07 | 5.7512E-11 |
| 31 | 0.0000E+00 | 0.0000E+00 | 2.7355E-05 | -9.1194E-08 | 3.8022E-11 |
| 32 | 0.0000E+00 | 0.0000E+00 | -3.4545E-06 | -5.0725E-08 | 2.0803E-11 |
| 41 | 0.0000E+00 | 0.0000E+00 | 1.8211E-05 | 2.0401E-08 | 1.4183E-11 |
| 42 | 0.0000E+00 | 0.0000E+00 | -9.5673E-05 | 1.2288E-07 | -3.7243E-11 |

| No. | a10 | a12 | a14 | a16 |
|---|---|---|---|---|
| 11 | -4.1007E-13 | -2.2749E-15 | -1.0999E-17 | -2.4173E-20 |
| 12 | -5.0793E-13 | -3.8292E-15 | -1.7751E-17 | -6.7922E-20 |
| 21 | -3.0494E-13 | -6.6477E-16 | -8.2174E-19 | -4.9393E-22 |
| 22 | 1.2581E-13 | 3.0749E-16 | 4.6061E-19 | 1.5027E-22 |
| 31 | 1.7297E-14 | 6.0952E-17 | 2.5530E-19 | 9.2290E-22 |
| 32 | 2.1525E-14 | 2.9715E-17 | -9.0673E-21 | -2.1321E-22 |
| 41 | -3.6732E-15 | -2.9553E-17 | -3.6716E-21 | 4.2472E-23 |
| 42 | -4.8395E-14 | -3.2363E-17 | -3.2878E-21 | 2.3561E-24 |

FIG. 32

| Sixth Example ||||||||
|---|---|---|---|---|---|---|---|
| EFL=30.1295 mm, ω=44.9997 Degrees, TTL=36.4973 mm, Fno=7.5894 ||||||||
| No. | | Curvature Radius | Lens Thickness Air Gap | | Refractive Index | Abbe No. | Focal Length | Semi-Diameter |
| | Observer's Pupil | | 12.0000 | | | | | 2.0000 |
| 11 | First Lens | -32.9299 | 5.4472 | T1 | 1.5445 | 55.9870 | 43.7532 | 12.6962 |
| 12 | | -14.6292 | 0.0385 | G12 | | | | 13.2981 |
| 21 | Second Lens | 19.5672 | 7.0049 | T2 | 1.5445 | 55.9870 | 44.3852 | 17.7242 |
| 22 | | 89.8171 | 4.2800 | G23 | | | | 18.1345 |
| 31 | Third Lens | -1058.2791 | 4.1754 | T3 | 1.6606 | 20.4012 | -35.7112 | 18.3895 |
| 32 | | 24.1662 | 13.0648 | G34 | | | | 18.8680 |
| 41 | Fourth Lens | 366.8345 | 1.4991 | T4 | 1.5348 | 55.6899 | -283.1026 | 19.8492 |
| 42 | | 107.0234 | 0.9872 | G4D | | | | 21.0079 |
| 71 | Display Screen | Infinity | 0.0000 | | | | | 25.7488 |

FIG. 33

| No. | K | a2 | a4 | a6 | a8 |
|---|---|---|---|---|---|
| 11 | 0.0000E+00 | 0.0000E+00 | 5.2895E-05 | -3.1537E-08 | 0.0000E+00 |
| 12 | -4.2996E+00 | 0.0000E+00 | -1.1207E-04 | 3.5862E-07 | 0.0000E+00 |
| 21 | -1.1330E-01 | 0.0000E+00 | -4.5049E-05 | -9.5293E-08 | 0.0000E+00 |
| 22 | 0.0000E+00 | 0.0000E+00 | -2.9342E-06 | -1.2368E-07 | 0.0000E+00 |
| 31 | 0.0000E+00 | 0.0000E+00 | 4.4685E-05 | -9.2592E-08 | 0.0000E+00 |
| 32 | 0.0000E+00 | 0.0000E+00 | 6.8155E-06 | -5.8419E-08 | 0.0000E+00 |
| 41 | 0.0000E+00 | 0.0000E+00 | -1.1717E-05 | -2.9994E-08 | -5.1595E-11 |
| 42 | 0.0000E+00 | 0.0000E+00 | -3.7747E-05 | 8.3690E-09 | 0.0000E+00 |

| No. | a10 | a12 | a14 | a16 |
|---|---|---|---|---|
| 11 | 0.0000E+00 | 0.0000E+00 | 0.0000E+00 | 0.0000E+00 |
| 12 | 0.0000E+00 | 0.0000E+00 | 0.0000E+00 | 0.0000E+00 |
| 21 | 0.0000E+00 | 0.0000E+00 | 0.0000E+00 | 0.0000E+00 |
| 22 | 0.0000E+00 | 0.0000E+00 | 0.0000E+00 | 0.0000E+00 |
| 31 | 0.0000E+00 | 0.0000E+00 | 0.0000E+00 | 0.0000E+00 |
| 32 | 0.0000E+00 | 0.0000E+00 | 0.0000E+00 | 0.0000E+00 |
| 41 | 0.0000E+00 | 0.0000E+00 | 0.0000E+00 | 0.0000E+00 |
| 42 | 0.0000E+00 | 0.0000E+00 | 0.0000E+00 | 0.0000E+00 |

FIG. 34

| Seventh Example | | | | | | | |
|---|---|---|---|---|---|---|---|
| EFL=31.6870 mm, ω=45.0030 Degrees, TTL=44.1791 mm, Fno=7.8786 | | | | | | | |
| No. | | Curvature Radius | Lens Thickness Air Gap | | Refractive Index | Abbe No. | Focal Length | Semi-Diameter |
| | Observer's Pupil | | 10.2739 | | | | | 2.0000 |
| 11 | First Lens | -52.7728 | 6.5924 | T1 | 1.5445 | 55.9870 | 44.5975 | 11.8407 |
| 12 | | -17.3632 | 0.7853 | G12 | | | | 12.8462 |
| 21 | Second Lens | 22.5960 | 5.4724 | T2 | 1.5445 | 55.9870 | 47.1172 | 15.4584 |
| 22 | | 173.3077 | 0.9942 | G23 | | | | 15.8727 |
| 31 | Third Lens | -160.9835 | 19.5560 | T3 | 1.6606 | 20.4012 | -30.7166 | 16.0215 |
| 32 | | 24.3395 | 8.6581 | G34 | | | | 20.3702 |
| 41 | Fourth Lens | -64.0868 | 1.2933 | T4 | 1.5348 | 55.6899 | -74.9774 | 20.4086 |
| 42 | | 107.8958 | 0.8275 | G4D | | | | 20.3973 |
| 71 | Display Screen | Infinity | 0.0000 | | | | | 20.8014 |

FIG. 35

| No. | K | a2 | a4 | a6 | a8 |
|---|---|---|---|---|---|
| 11 | 0.0000E+00 | 0.0000E+00 | 5.6529E-05 | -3.9046E-08 | -2.3159E-10 |
| 12 | -5.4051E+00 | 0.0000E+00 | -1.1368E-04 | 3.3117E-07 | -3.2362E-11 |
| 21 | -4.5514E-01 | 0.0000E+00 | -6.7912E-05 | -7.1070E-08 | 7.2823E-12 |
| 22 | 0.0000E+00 | 0.0000E+00 | -4.0784E-05 | -9.8418E-08 | 4.2958E-11 |
| 31 | 0.0000E+00 | 0.0000E+00 | -4.2048E-07 | -2.5863E-08 | 3.9590E-11 |
| 32 | 0.0000E+00 | 0.0000E+00 | -2.1802E-05 | -2.6741E-08 | 3.8221E-11 |
| 41 | 0.0000E+00 | 0.0000E+00 | -1.1240E-05 | 3.0077E-08 | 5.9293E-12 |
| 42 | 0.0000E+00 | 0.0000E+00 | -3.8271E-05 | -1.0166E-08 | 7.4918E-12 |

| No. | a10 | a12 | a14 | a16 |
|---|---|---|---|---|
| 11 | -4.8505E-13 | 6.9951E-16 | 1.1035E-17 | 4.3053E-20 |
| 12 | 1.2591E-13 | 3.3879E-16 | -4.3935E-18 | -5.2958E-20 |
| 21 | 6.4411E-14 | 2.4635E-16 | 8.3332E-19 | 2.4325E-22 |
| 22 | 4.4216E-14 | -2.6470E-16 | -1.7149E-18 | -5.6963E-21 |
| 31 | -2.2681E-14 | -1.8484E-16 | -8.7601E-19 | -3.5946E-21 |
| 32 | -4.0416E-14 | -9.4707E-17 | -1.6616E-19 | -4.0574E-22 |
| 41 | -1.7595E-14 | -1.0758E-17 | 5.7075E-20 | 2.3050E-22 |
| 42 | 9.3563E-14 | 1.6101E-16 | 1.7425E-19 | -7.7665E-23 |

FIG. 36

| Eighth Example ||||||||
|---|---|---|---|---|---|---|---|
| EFL=37.0412 mm, ω=45.0013 Degrees, TTL=43.4587 mm, Fno= 9.2224 ||||||||
| No. | | Curvature Radius | Lens Thickness Air Gap | | Refractive Index | Abbe No. | Focal Length | Semi-Diameter |
| | Observer's Pupil | | 12.0000 | | | | | 2.0000 |
| 11 | First Lens | -56.9721 | 6.4863 | T1 | 1.5445 | 55.9870 | 48.3250 | 13.5945 |
| 12 | | -18.7222 | 5.4022 | G12 | | | | 14.3327 |
| 21 | Second Lens | 20.7178 | 5.7950 | T2 | 1.5445 | 55.9870 | 49.6464 | 20.0092 |
| 22 | | 79.9435 | 5.9440 | G23 | | | | 20.1532 |
| 31 | Third Lens | -153.9782 | 4.0710 | T3 | 1.6606 | 20.4012 | -36.0099 | 21.3391 |
| 32 | | 28.4301 | 12.1523 | G34 | | | | 23.9769 |
| 41 | Fourth Lens | -70.3300 | 0.4855 | T4 | 1.5348 | 55.6899 | -131.4968 | 24.4243 |
| 42 | | 7377283.0229 | 3.1224 | G4D | | | | 24.9946 |
| 71 | Display Screen | Infinity | 0.0000 | | | | | 27.4276 |

FIG. 37

| No. | K | a2 | a4 | a6 | a8 |
|---|---|---|---|---|---|
| 11 | 0.0000E+00 | 0.0000E+00 | 3.6146E-05 | 8.1739E-10 | 0.0000E+00 |
| 12 | -6.5693E+00 | 0.0000E+00 | -1.0390E-04 | 3.1649E-07 | 0.0000E+00 |
| 21 | -1.9218E-01 | 0.0000E+00 | -3.7267E-05 | -7.2388E-08 | 0.0000E+00 |
| 22 | 0.0000E+00 | 0.0000E+00 | 1.6471E-06 | -9.0605E-08 | 0.0000E+00 |
| 31 | 0.0000E+00 | 0.0000E+00 | 3.6112E-05 | -6.1440E-08 | 0.0000E+00 |
| 32 | 0.0000E+00 | 0.0000E+00 | 5.3904E-07 | -2.7257E-08 | 0.0000E+00 |
| 41 | 0.0000E+00 | 0.0000E+00 | -5.8001E-06 | 1.4174E-08 | 2.2195E-13 |
| 42 | 0.0000E+00 | 0.0000E+00 | -7.2073E-06 | 1.3489E-09 | 0.0000E+00 |

| No. | a10 | a12 | a14 | a16 |
|---|---|---|---|---|
| 11 | 0.0000E+00 | 0.0000E+00 | 0.0000E+00 | 0.0000E+00 |
| 12 | 0.0000E+00 | 0.0000E+00 | 0.0000E+00 | 0.0000E+00 |
| 21 | 0.0000E+00 | 0.0000E+00 | 0.0000E+00 | 0.0000E+00 |
| 22 | 0.0000E+00 | 0.0000E+00 | 0.0000E+00 | 0.0000E+00 |
| 31 | 0.0000E+00 | 0.0000E+00 | 0.0000E+00 | 0.0000E+00 |
| 32 | 0.0000E+00 | 0.0000E+00 | 0.0000E+00 | 0.0000E+00 |
| 41 | 0.0000E+00 | 0.0000E+00 | 0.0000E+00 | 0.0000E+00 |
| 42 | 0.0000E+00 | 0.0000E+00 | 0.0000E+00 | 0.0000E+00 |

FIG. 38

| Example | First | Second | Third | Fourth | Fifth | Sixth | Seventh | Eighth |
|---|---|---|---|---|---|---|---|---|
| ER | 11.758 | 12.247 | 9.309 | 11.142 | 10.412 | 12.000 | 10.274 | 12.000 |
| T1 | 7.465 | 9.849 | 9.944 | 9.115 | 6.682 | 5.447 | 6.592 | 6.486 |
| G1 | 0.020 | 0.197 | 0.040 | 0.056 | 0.051 | 0.038 | 0.785 | 5.402 |
| T2 | 6.221 | 8.207 | 8.271 | 7.996 | 5.568 | 7.005 | 5.472 | 5.795 |
| G2 | 1.829 | 2.267 | 1.573 | 1.875 | 1.825 | 4.280 | 0.994 | 5.944 |
| T3 | 5.332 | 7.035 | 7.095 | 6.489 | 4.773 | 4.175 | 19.556 | 4.071 |
| G3 | 20.137 | 8.185 | 8.051 | 0.639 | 14.886 | 13.065 | 8.658 | 12.152 |
| T4 | 3.015 | 15.759 | 1.500 | 2.525 | 6.760 | 1.499 | 1.293 | 0.485 |
| G4 | 0.806 | 1.161 | 3.561 | 19.233 | 4.226 | 0.987 | 0.827 | 3.122 |
| AAG | 21.986 | 10.649 | 9.663 | 2.569 | 16.761 | 17.383 | 10.438 | 23.498 |
| ALT | 22.034 | 40.851 | 26.809 | 26.125 | 23.784 | 18.127 | 32.914 | 16.838 |
| TTL | 44.826 | 52.661 | 40.034 | 47.927 | 44.771 | 36.497 | 44.179 | 43.459 |
| SL | 56.584 | 64.907 | 49.343 | 59.069 | 55.183 | 48.497 | 54.453 | 55.459 |
| EFL | 36.413 | 38.811 | 28.013 | 36.721 | 42.461 | 30.130 | 31.687 | 37.041 |
| TL | 44.021 | 51.500 | 36.473 | 28.694 | 40.545 | 35.510 | 43.352 | 40.336 |
| ALT/ER | 1.874 | 3.336 | 2.880 | 2.345 | 2.284 | 1.511 | 3.204 | 1.403 |
| G3/(G1+G2) | 10.890 | 3.322 | 4.992 | 0.331 | 7.935 | 3.025 | 4.866 | 1.071 |
| AAG/(G1+G2) | 11.890 | 4.322 | 5.992 | 1.331 | 8.935 | 4.025 | 5.866 | 2.071 |
| TTL/ER | 3.812 | 4.300 | 4.301 | 4.302 | 4.300 | 3.041 | 4.300 | 3.622 |
| T4/T1 | 0.404 | 1.600 | 0.151 | 0.277 | 1.012 | 0.275 | 0.196 | 0.075 |
| SL/ER | 4.812 | 5.300 | 5.301 | 5.302 | 5.300 | 4.041 | 5.300 | 4.622 |
| T4/(G1+G2) | 1.631 | 6.396 | 0.930 | 1.308 | 3.604 | 0.347 | 0.727 | 0.043 |
| ALT/T1 | 2.952 | 4.148 | 2.696 | 2.866 | 3.559 | 3.328 | 4.993 | 2.596 |
| AAG/T1 | 2.945 | 1.081 | 0.972 | 0.282 | 2.508 | 3.191 | 1.583 | 3.623 |
| EFL/ER | 3.097 | 3.169 | 3.009 | 3.296 | 4.078 | 2.511 | 3.084 | 3.087 |
| T3/(G1+G2) | 2.884 | 2.855 | 4.399 | 3.362 | 2.544 | 0.967 | 10.990 | 0.359 |
| SL/(G1+G2) | 30.600 | 26.342 | 30.595 | 30.601 | 29.417 | 11.230 | 30.601 | 4.888 |
| (T1+G4)/(G2+T3) | 1.155 | 1.184 | 1.558 | 3.389 | 1.653 | 0.761 | 0.361 | 0.959 |
| T1/T2 | 1.200 | 1.200 | 1.202 | 1.140 | 1.200 | 0.778 | 1.205 | 1.119 |
| T1/T3 | 1.400 | 1.400 | 1.402 | 1.405 | 1.400 | 1.305 | 0.337 | 1.593 |
| TTL/T1 | 8.406 | 7.485 | 5.643 | 7.386 | 9.380 | 8.741 | 2.259 | 10.675 |
| 250mm/EFL | 6.866 | 6.441 | 8.925 | 6.808 | 5.888 | 8.298 | 7.890 | 6.749 |
| TL/ER | 3.744 | 4.205 | 3.918 | 2.575 | 3.894 | 2.959 | 4.220 | 3.361 |

FIG. 39

OCULAR OPTICAL SYSTEM

BACKGROUND OF THE INVENTION

1. Field of the Invention

The present invention generally relates to an ocular optical system. Specifically speaking, the present invention is directed to an ocular optical system for use in a virtual reality (VR) electronic device.

2. Description of the Prior Art

Virtual reality is a three-dimensional virtual world which is created by the simulation of the computer technology to provide the users with sensual simulations such as visual contact and audio contact and to make the users believe as if it were true. The current virtual reality devices available are mainly directed to the visual experiences. Stereopsis is achieved by two divided pictures with slight differences corresponding to two viewing angles of two eyes to simulate the natural parallaxis of human eyes. In order to decrease the volume of a virtual reality device, it is a principle subject of the development of the virtual reality to make the users feel enlarged visual experiences by means of smaller display picture sizes.

A conventional ocular optical system usually has a smaller half field of view and makes a viewer experience a narrow visual field, low resolution and the parallaxis is so bad that parallaxis compensation has to be done to the display pictures in advance so a larger half field of view and better imaging quality become the major problems to be solved.

SUMMARY OF THE INVENTION

In the light of the above mentioned issues, the present invention proposes an ocular optical system with a larger half field of view and better imaging quality for use in a virtual reality electronic device in response to the principle subject of the development of the virtual reality.

The present invention in a first aspect proposes an ocular optical system. The ocular optical system is applied to imaging rays coming from a display screen into an observer's eyes via the ocular optical system, with an eye side facing toward the observer's eyes and with a display side facing toward the display screen. The ocular optical system from the eye side toward the display side in order along an optical axis includes a first lens element, a second lens element, a third lens element and a fourth lens element. The first lens element to the fourth lens element each has an eye-side surface facing toward the eye side and a display-side surface facing toward the display side.

The second lens element has an eye-side surface with a concave portion in a vicinity of its periphery. The third lens element has negative refractive power. The fourth lens element has a display-side surface with a concave portion in a vicinity of the optical-axis.

In the ocular optical system for use in virtual reality of the present invention, ALT is a total thickness of all four lens elements and ER is a distance between a pupil of the observer and the first lens element to satisfy ALT/ER≤3.4.

In the ocular optical system for use in virtual reality of the present invention, G12 is an air gap between the first lens element and the second lens element along the optical axis, G23 is an air gap between the second lens element and the third lens element along the optical axis and G34 is an air gap between the third lens element and the fourth lens element along the optical axis to satisfy G34/(G12+G23)≤10.9.

In the ocular optical system for use in virtual reality of the present invention, AAG is a sum of all three air gaps between each lens elements from the first lens element to the fourth lens element along the optical axis to satisfy AAG/(G12+G23)≤11.9

In the ocular optical system for use in virtual reality of the present invention, TTL is a distance between an eye-side surface of the first lens element and the display screen to satisfy TTL/ER≤4.4.

In the ocular optical system for use in virtual reality of the present invention, SL is a thickness of the first lens element along the optical axis and T4 is a thickness of the fourth lens element along the optical axis to satisfy T4/T1≤1.6.

In the ocular optical system for use in virtual reality of the present invention, SL is a distance between a pupil of the observer and the display screen to satisfy SL/ER≤5.4.

In the ocular optical system for use in virtual reality of the present invention, EFL is an effective focal length of the ocular optical system to satisfy 3≤250 mm/EFL≤15.

The present invention in a second aspect proposes another ocular optical system. The ocular optical system is applied to imaging rays coming from a display screen into an observer's eyes via the ocular optical system, with an eye side facing toward the observer's eyes and with a display side facing toward the display screen. The ocular optical system from the eye side toward the display side in order along an optical axis includes a first lens element, a second lens element, a third lens element and a fourth lens element. The first lens element to the fourth lens element each has an eye-side surface facing toward the eye side and a display-side surface facing toward the display side.

The first lens element has a display-side surface with a convex portion in a vicinity of its periphery. The second lens element has positive refractive power and an eye-side surface with a concave portion in a vicinity of its periphery. The fourth lens element has a display-side surface with a concave portion in a vicinity of the optical-axis.

In the ocular optical system for use in virtual reality of the present invention, T4 is a thickness of the fourth lens element along the optical axis, G12 is an air gap between the first lens element and the second lens element along the optical axis and G23 is an air gap between the second lens element and the third lens element along the optical axis to satisfy T4/(G12+G23)≤6.4.

In the ocular optical system for use in virtual reality of the present invention, ALT is a total thickness of all four lens elements and T1 is a thickness of the first lens element along the optical axis to satisfy ALT/T1≤5.

In the ocular optical system for use in virtual reality of the present invention, AAG is a sum of all three air gaps between each lens elements from the first lens element to the fourth lens element along the optical axis to satisfy AAG/T1≤3.7.

In the ocular optical system for use in virtual reality of the present invention, EFL is an effective focal length of the ocular optical system and ER is a distance between a pupil of the observer to an eye-side surface of the first lens element to satisfy EFL/ER≤4.1.

In the ocular optical system for use in virtual reality of the present invention, T3 is a thickness of the third lens element along the optical axis to satisfy T3/(G12+G23)≤16.5.

The present invention in a third aspect proposes still another ocular optical system. The ocular optical system is applied to imaging rays coming from a display screen into an observer's eyes via the ocular optical system, with an eye side facing toward the observer's eyes and with a display side facing toward the display screen. The ocular optical system from the eye side toward the display side in order along an optical axis includes a first lens element, a second lens element, a third lens element and a fourth lens element. The first lens element to the fourth lens element each has an eye-side surface facing toward the eye side and a display-side surface facing toward the display side.

The second lens element has an eye-side surface with a concave portion in a vicinity of its periphery. The third lens element has a display-side surface with a concave portion in a vicinity of the optical-axis. The fourth lens element has a display-side surface with a concave portion in a vicinity of the optical-axis.

In the ocular optical system for use in virtual reality of the present invention, SL is a distance between a pupil of the observer and the display screen, G12 is an air gap between the first lens element and the second lens element along the optical axis and G23 is an air gap between the second lens element and the third lens element along the optical axis to satisfy $SL/(G12+G23) \le 30.7$.

In the ocular optical system for use in virtual reality of the present invention, T1 is a thickness of the first lens element along the optical axis, T3 is a thickness of the third lens element along the optical axis, G23 is an air gap between the second lens element and the third lens element along the optical axis and G4D is a distance between the fourth lens element and the display screen along the optical axis to satisfy $(T1+G4D)/(G23+T3) \le 3.6$.

In the ocular optical system for use in virtual reality of the present invention, T2 is a thickness of the second lens element along the optical axis to satisfy $T1/T2 \le 1.3$.

The ocular optical system for use in virtual reality of the present invention satisfies $T1/T3 \le 1.6$.

In the ocular optical system for use in virtual reality of the present invention, TTL is a distance between an eye-side surface of the first lens element and the display screen to satisfy $TTL/T1 \le 10.7$.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 2-6 illustrates the methods for determining the surface shapes and for determining one region is a region in a vicinity of the optical axis or the region in a vicinity of its circular periphery of one lens element.

FIG. 9 illustrates a second example of the ocular optical system of four lens elements of the present invention.

FIG. 10A illustrates the longitudinal spherical aberration on the image plane of the second example.

FIG. 10B illustrates the astigmatic aberration on the sagittal direction of the second example.

FIG. 10C illustrates the astigmatic aberration on the tangential direction of the second example.

FIG. 10D illustrates the distortion aberration of the second example.

FIG. 23 shows the optical data of the first example of the ocular optical system.

FIG. 24 shows the aspheric surface data of the first example.

FIG. 25 shows the optical data of the second example of the ocular optical system.

FIG. 26 shows the aspheric surface data of the second example.

FIG. 27 shows the optical data of the third example of the ocular optical system.

FIG. 28 shows the aspheric surface data of the third example.

FIG. 29 shows the optical data of the fourth example of the ocular optical system.

FIG. 30 shows the aspheric surface data of the fourth example.

FIG. 31 shows the optical data of the fifth example of the ocular optical system.

FIG. 32 shows the aspheric surface data of the fifth example.

FIG. 33 shows the optical data of the sixth example of the ocular optical system.

FIG. 34 shows the aspheric surface data of the sixth example.

FIG. 35 shows the optical data of the seventh example of the ocular optical system.

FIG. 36 shows the aspheric surface data of the seventh example.

FIG. 37 shows the optical data of the eighth example of the ocular optical system.

FIG. 38 shows the aspheric surface data of the eighth example.

FIG. 39 shows some important ratios in the examples.

DETAILED DESCRIPTION

Before the detailed description of the present invention, the first thing to be noticed is that in the present invention, similar (not necessarily identical) elements are labeled as the same numeral references.

Figure 1:
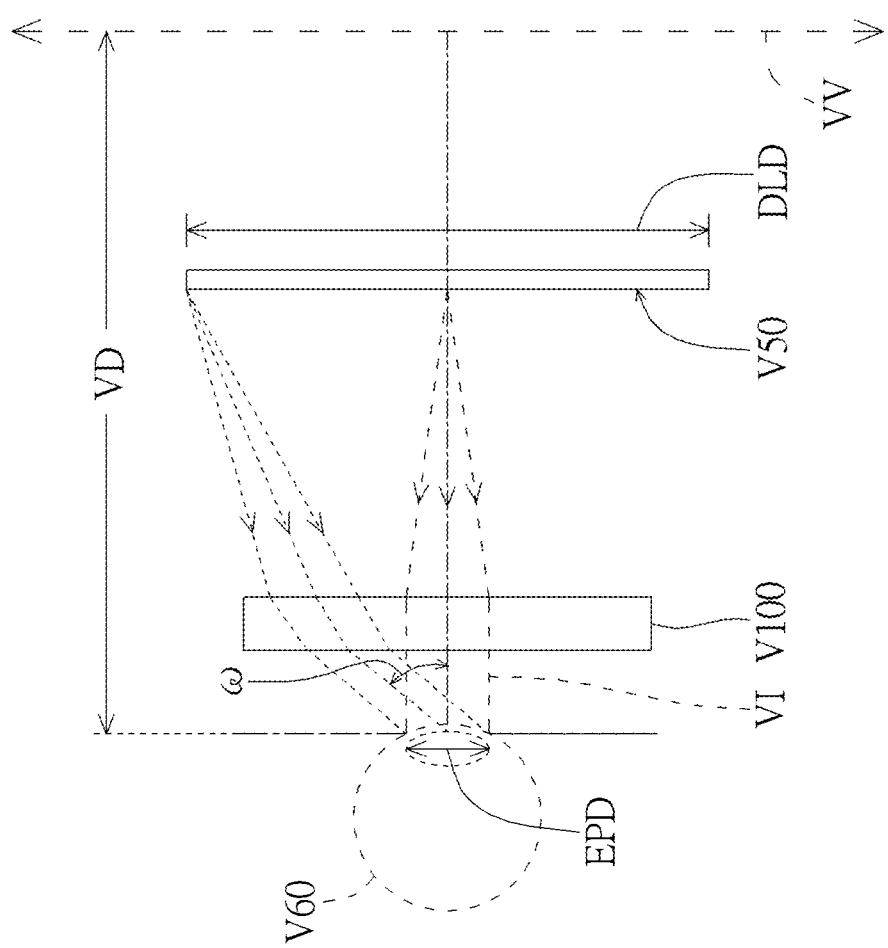
FIG. 1 illustrates a schematic representation of imaging rays emitted by a display screen and entering an eye via an ocular optical system, and then focusing on a retina of the eye.

In general, a ray direction of an ocular optical system V100 refers to the following: imaging rays VI are emitted by a display screen V50, enter an eye V60 via the ocular optical system V100, and are then focused on a retina of the eye V60 for imaging and generating an enlarged virtual image VV at a least distance of distinct vision VD, as depicted in FIG. 1. The following criteria for determining optical specifications of the present application are based on assumption that a reversely tracking of the ray direction is parallel imaging rays passing through the ocular optical system from an eye-side and focused on the display screen for imaging.

In the present specification, the description "a lens element having positive refracting power (or negative refracting power)" means that the paraxial refracting power of the lens element in Gaussian optics is positive (or negative). The description "An eye-side (or display-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 2 as an example, I is an optical axis and the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

Figures 2, 3:
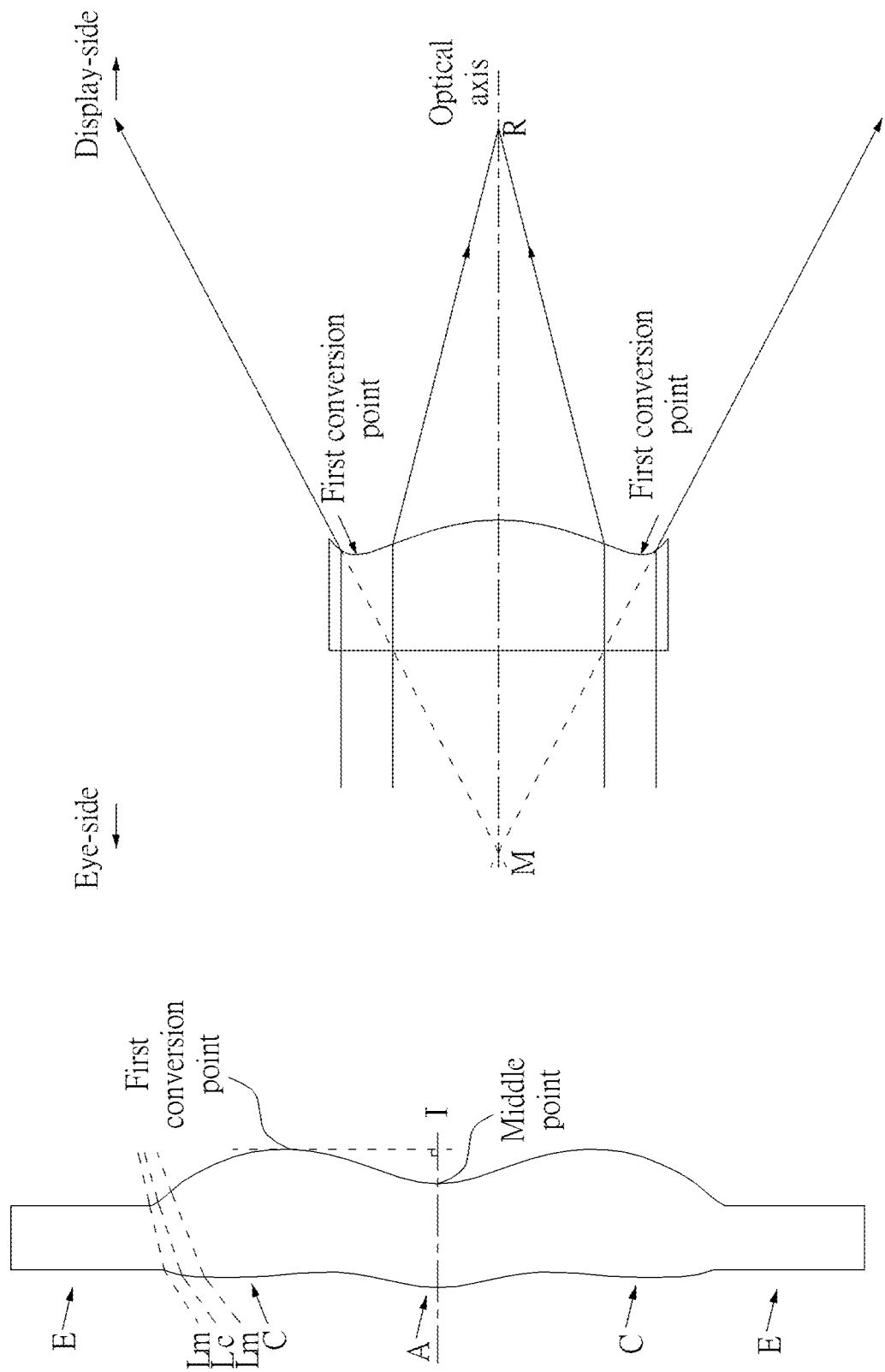

1. FIG. 2 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 3, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the eye-side or display-side. For instance, if the ray itself intersects the optical axis at the display-side of the lens element after passing through a portion, i.e. the focal point of this ray is at the display-side (see point R in FIG. 3), the portion will be determined as having a convex shape. On the contrary, if the ray diverges after passing through a portion, the extension line of the ray intersects the optical axis at the eye-side of the lens element, i.e. the focal point of the ray is at the eye-side (see point M in FIG. 3), that portion will be determined as having a concave shape. Therefore, referring to FIG. 3, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an eye-side surface, positive R means that the eye-side surface is convex, and negative R means that the eye-side surface is concave. Conversely, for a display-side surface, positive R means that the display-side surface is concave, and negative R means that the display-side surface is convex. The result found by using this method should be consistent as by using the other way mentioned above, which determines surface shapes by referring to whether the focal point of a collimated ray is at the eye-side or the display-side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 4, only one transition point, namely a first transition point, appears within the clear aperture of the display-side surface of the lens element. Portion I is a portion in a vicinity of the optical axis, and portion II is a portion in a vicinity of a periphery of the lens element. The portion in a vicinity of the optical axis is determined as having a concave surface due to the R value at the display-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 5, a first transition point and a second transition point exist on the eye-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the eye-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 6, no transition point exists on the eye-side surface of the lens element. In this case, the portion between 0~50% of the effective radius (radius of the clear aperture) is determined as the portion in a vicinity of the optical axis, and the portion between 5~100% of the effective radius is determined as the portion in a vicinity of a periphery of the lens element. The portion in a vicinity of the optical axis of the eye-side surface of the lens element is determined as having a convex shape due to its positive R value, and the portion in a vicinity of a periphery of the lens element is determined as having a convex shape as well.

Figure 7:
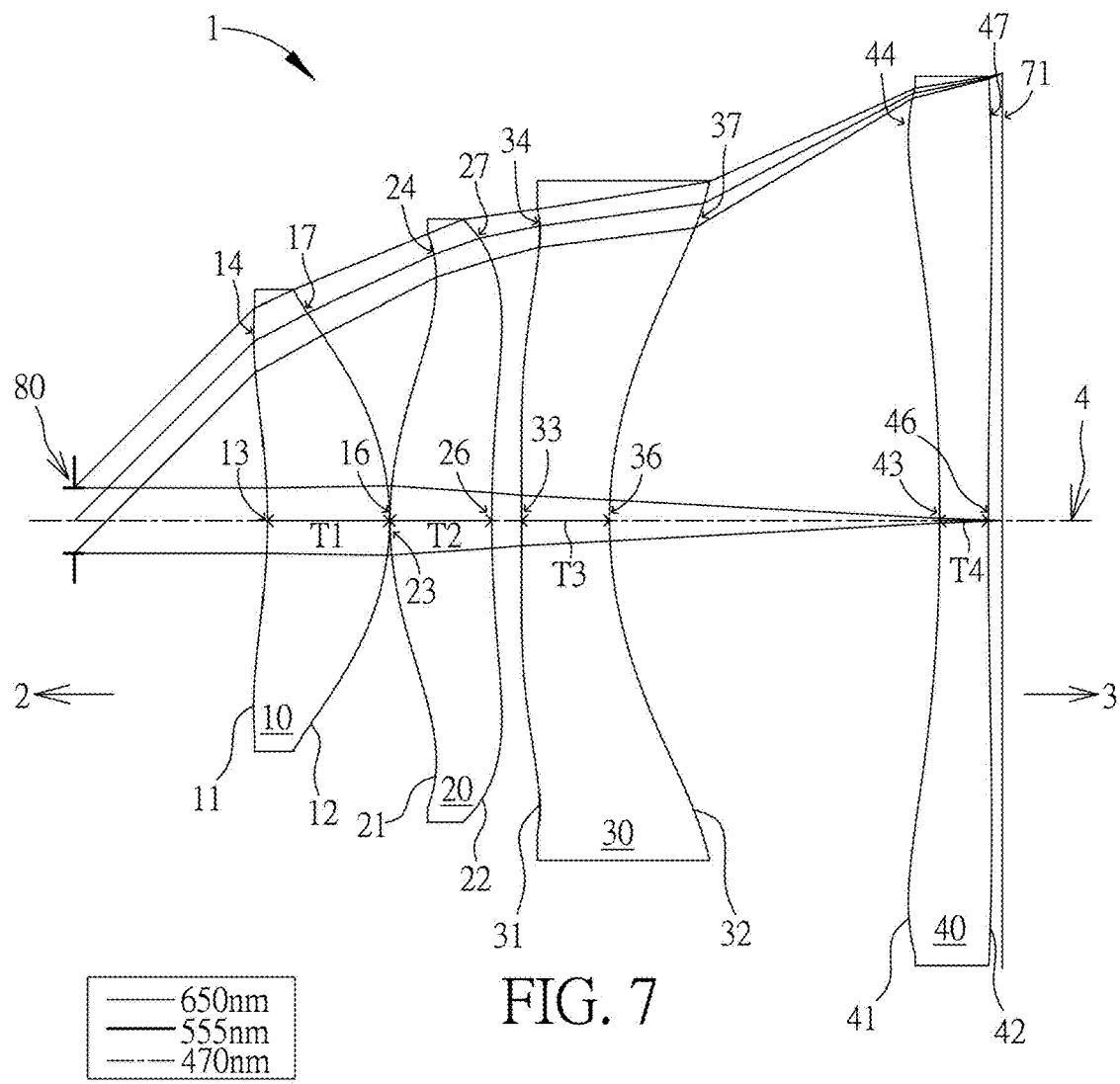
FIG. 7 illustrates a first example of the ocular optical system of the present invention.

As shown in FIG. 7, the ocular optical system 1 of four lens elements of the present invention, sequentially located from an eye side 2 (where an eye of an observer is located) to a display side 3 along an optical axis 4, has a first lens element 10, a second lens element 20, a third lens element 30, a fourth lens element 40 and a display screen 71. Generally speaking, the first lens element 10, the second lens element 20, the third lens element 30, the fourth lens element 40 may be made of a transparent plastic material but the present invention is not limited to this, and each has an appropriate refractive power. Usually there are exclusively four lens elements, namely the first lens element 10, the second lens element 20, the third lens element 30 and the fourth lens element 40, with refractive power in the ocular optical system 1 of the present invention. The optical axis 4 is the optical axis of the entire ocular optical system 1, and the optical axis of each of the lens elements coincides with the optical axis of the ocular optical system 1.

Furthermore, a pupil of an observer 80 is disposed in an appropriate position. In FIG. 7, the pupil 80 is disposed at the eye side 2. When light emitted from the display screen 71 at the image side 3, it forms a clear and sharp image of high quality in the eye of the observer after passing through the fourth lens element 40, the third lens element 30, the second lens element 20, the first lens element 10 and the pupil 80.

Each lens element in the ocular optical system 1 of the present invention has an eye-side surface facing toward the eye side 2 as well as a display-side surface facing toward the display side 3. For example, the first lens element 10 has an eye-side surface 11 and a display-side surface 12; the second lens element 20 has an eye-side surface 21 and a display-side surface 22; the third lens element 30 has an eye-side surface 31 and a display-side surface 32; the fourth lens element 40 has an eye-side surface 41 and a display-side surface 42. In addition, each eye-side surface and display-side surface in the ocular optical system 1 of the present invention has a part (or portion) in a vicinity of its periphery (circular periphery part) away from the optical axis 4 as well as a part in a vicinity of the optical axis (optical axis part) close to the optical axis 4.

Each lens element in the ocular optical system 1 of the present invention further has a central thickness T on the optical axis 4. For example, the first lens element 10 has a first lens element thickness T1, the second lens element 20 has a second lens element thickness T2, the third lens element 30 has a third lens element thickness T3, and the fourth lens element 40 has a fourth lens element thickness T4. Therefore, the total thickness of all the lens elements in the ocular optical system 1 along the optical axis 4 is ALT=T1+T2+T3+T4.

In addition, between two adjacent lens elements in the ocular optical system 1 of the present invention there may be an air gap along the optical axis 4. For example, there is an air gap G12 disposed between the first lens element 10 and the second lens element 20, an air gap G23 is disposed between the second lens element 20 and the third lens element 30, an air gap G34 is disposed between the third lens element 30 and the fourth lens element 40. Therefore, the sum of total three air gaps between adjacent lens elements from the first lens element 10 to the fourth lens element 40 along the optical axis 4 is AAG=G12+G23+G34.

In addition, the distance between the eye-side surface 11 of the first lens element 10 to the display screen 71, namely the total length of the ocular optical system 1 along the optical axis 4 is TTL; the distance between the pupil 80 of an observer to the display screen 71 along the optical axis 4 is SL; the distance from the eye-side surface 11 of the first lens element 10 to the display-side surface 42 of the fourth lens element 40 along the optical axis 4 is TL; the effective focal length of the ocular optical system is EFL; the distance between the display-side surface 42 of the fourth lens element 40 and the display screen 71 along the optical axis 4 is G4D; the distance between the pupil 80 of the observer to the eye-side surface 11 of the first lens element 10 along the optical axis 4 is ER (Eye relief); the exit pupil diameter, namely the diameter of the pupil 80 of an observer is EPD (in general, the EPD for most people is between 3-7 mm); the diagonal length of the display screen 70 corresponding to the single pupil 80 of the observer is DLD; the half apparent field of view of the ocular optical system, namely the half field of view of an observer is ω; and the aperture value (f-number) of the ocular optical system is Fno. It is noteworthy that in this example, Fno is calculated on the principle of optical reversibility, in which the eye side is deemed as an object side, the display side is deemed as an image side, and the pupil of the observer's eye is deemed as a pupil of the emitting rays, the value of Fno of all embodiments are based on the calculation.

Furthermore, the focal length of the first lens element 10 is f1; the focal length of the second lens element 20 is f2; the focal length of the third lens element 30 is f3; the focal length of the fourth lens element 40 is f4; the refractive index of the first lens element 10 is n1; the refractive index of the second lens element 20 is n2; the refractive index of the third lens element 30 is n3; the refractive index of the fourth lens element 40 is n4; the Abbe number of the first lens element 10 is υ1; the Abbe number of the second lens element 20 is υ2; the Abbe number of the third lens element 30 is υ3; and the Abbe number of the fourth lens element 40 is υ4; the optical effective path of the first lens element 10 is D1; the optical effective path of the second lens element 20 is D2; the optical effective path of the third lens element 30 is D3; the optical effective path of the fourth lens element 40 is D4.

First Example

Figures 8A, 8B, 8C, 8D:
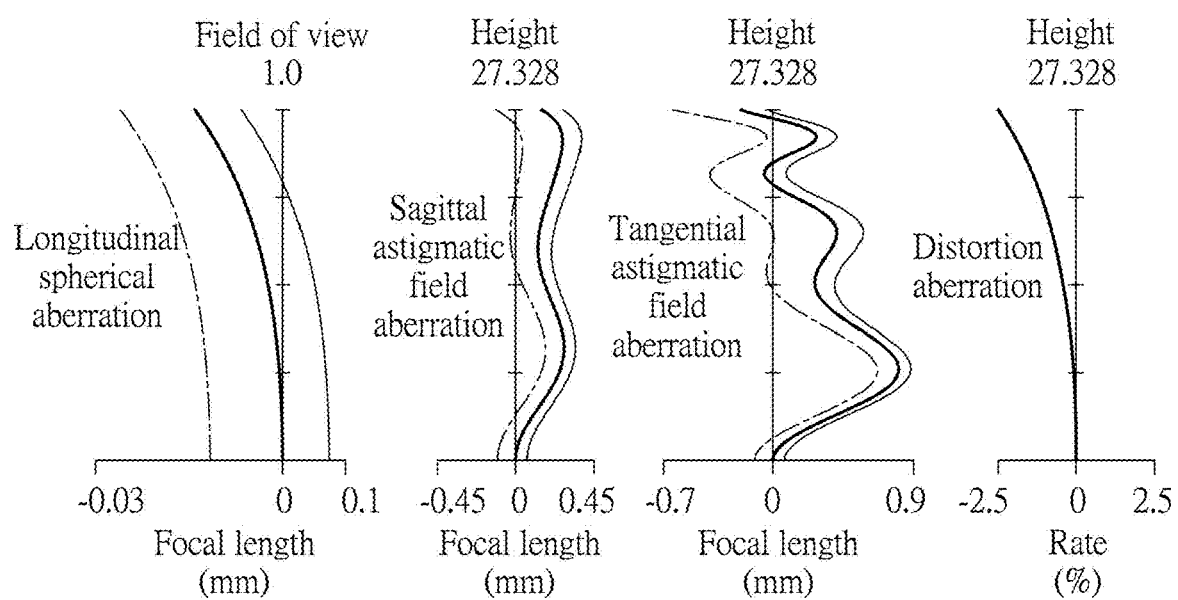
FIG. 8A illustrates the longitudinal spherical aberration on the image plane of the first example.
FIG. 8B illustrates the astigmatic aberration on the sagittal direction of the first example.
FIG. 8C illustrates the astigmatic aberration on the tangential direction of the first example.
FIG. 8D illustrates the distortion aberration of the first example.

Please refer to FIG. 7 which illustrates the first example of the ocular optical system 1 of the present invention. Please refer to FIG. 8A for the longitudinal spherical aberration on the display screen 71 of the first example; please refer to FIG. 8B for the astigmatic field aberration on the sagittal direction; please refer to FIG. 8C for the astigmatic field aberration on the tangential direction, and please refer to FIG. 8D for the distortion aberration. The Y axis of the spherical aberration in each example is "field of view" for 1.0. The Y axis of the astigmatic field and the distortion in each example stands for "image height", which is 27.328 mm.

The ocular optical system 1 of the first example has four lens elements 10 to 40 with refractive power. The first lens element 10 has positive refractive power. The eye-side surface 11 facing toward the eye side 2 has a concave part 13 in the vicinity of the optical axis and a convex part 14 in a vicinity of its periphery. The display-side surface 12 facing toward the display side 3 has a convex part 16 in the vicinity of the optical axis and a convex part 17 in a vicinity of its periphery. Besides, both the eye-side surface 11 and the display-side 12 of the first lens element 10 are aspherical surfaces.

The second lens element 20 has positive refractive power. The eye-side surface 21 facing toward the eye side 2 has a convex part 23 in the vicinity of the optical axis and a concave part 24 in a vicinity of its periphery. The display-side surface 22 facing toward the display side 3 has a concave part 26 in the vicinity of the optical axis and a convex part 27 in a vicinity of its periphery. Besides, both the eye-side surface 21 and the display-side surface 22 of the second lens element 20 are aspherical surfaces.

The third lens element 30 has negative refractive power. The eye-side surface 31 facing toward the eye side 2 has a concave part 33 in the vicinity of the optical axis and a concave part 34 in a vicinity of its periphery. The display-side surface 32 facing toward the display side 3 has a concave part 36 in the vicinity of the optical axis and a concave part 37 in a vicinity of its periphery. Both the eye-side surface 31 and the display-side 32 of the third lens element 30 are aspherical surfaces.

The fourth lens element 40 has negative refractive power. The eye-side surface 41 facing toward the eye side 2 has a concave part 43 in the vicinity of the optical axis and a convex part 44 in a vicinity of its periphery. The display-side surface 42 facing toward the display side 3 has a concave part 46 in the vicinity of the optical axis and a convex part 47 in a vicinity of its periphery. Both the eye-side surface 41 and the display-side 42 of the fourth lens element 40 are aspherical surfaces.

In the first lens element 10, the second lens element 20, the third lens element 30 and the fourth lens element 40 of the ocular optical system 1 of the present invention, there are 8 surfaces, such as the eye-side surfaces 11/21/31/41 and the display-side surfaces 12/22/32/42. All of these surfaces are aspherical surfaces, and these aspheric coefficients for the aspherical surfaces are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

In which:
R represents the curvature radius of the lens element surface;
Z represents the depth of an aspherical surface (the perpendicular distance between the point of the aspherical surface at a distance Y from the optical axis and the tangent plane of the vertex on the optical axis of the aspherical surface);
Y represents a vertical distance from a point on the aspherical surface to the optical axis;
K is a conic constant;
$a_i$ is the aspheric coefficient of the $i^{th}$ order.

The optical data of the first example of the ocular optical system 1 are shown in FIG. 23 while the aspheric surface data of the first example are shown in FIG. 24. In the present examples of the ocular optical system, the f-number of the entire ocular optical system is Fno, EFL is the effective focal length, ω stands for the half apparent field of view which is half of the field of view of the observer, and the unit for the curvature radius, the thickness and the focal length is in millimeters (mm). EFL is 36.4134 mm. ω is 45.0008 degrees. TTL is 44.8263 mm. Fno is 9.1025. The image height is 27.328 mm.

Second Example

Please refer to FIG. 9 which illustrates the second example of the ocular optical system 1 of the present invention. It is noted that from the second example to the following examples, in order to simplify the figures, only the components different from what the first example has, and the basic lens elements will be labeled in figures. Other components that are the same as what the first example has, such as the eye-side surface, the display-side surface, the part in a vicinity of the optical axis and the part in a vicinity of its circular periphery will be omitted in the following examples. Please refer to FIG. 10A for the longitudinal spherical aberration on the display screen 71 of the second example, please refer to FIG. 10B for the astigmatic aberration on the sagittal direction, please refer to FIG. 10C for the astigmatic aberration on the tangential direction, and please refer to FIG. 10D for the distortion aberration. The components in the second example are similar to those in the first example, but the optical data such as the curvature radius, the refractive power, the lens thickness, the lens focal length, the aspheric surface or the back focal length in this example are different from the optical data in the first example.

The optical data of the second example of the ocular optical system are shown in FIG. 25 while the aspheric surface data are shown in FIG. 26. EFL is 38.8114 mm. ω is 45.0009 degrees. TTL is 52.6607 mm. Fno is 9.6962. The image height is 27.325 mm. In particular, 1) the ω of the second example is larger than that of the first example of the present invention, 2) the astigmatic aberration on the tangential direction of the second example is better than that of the first example of the present invention.

Third Example

Figure 11:
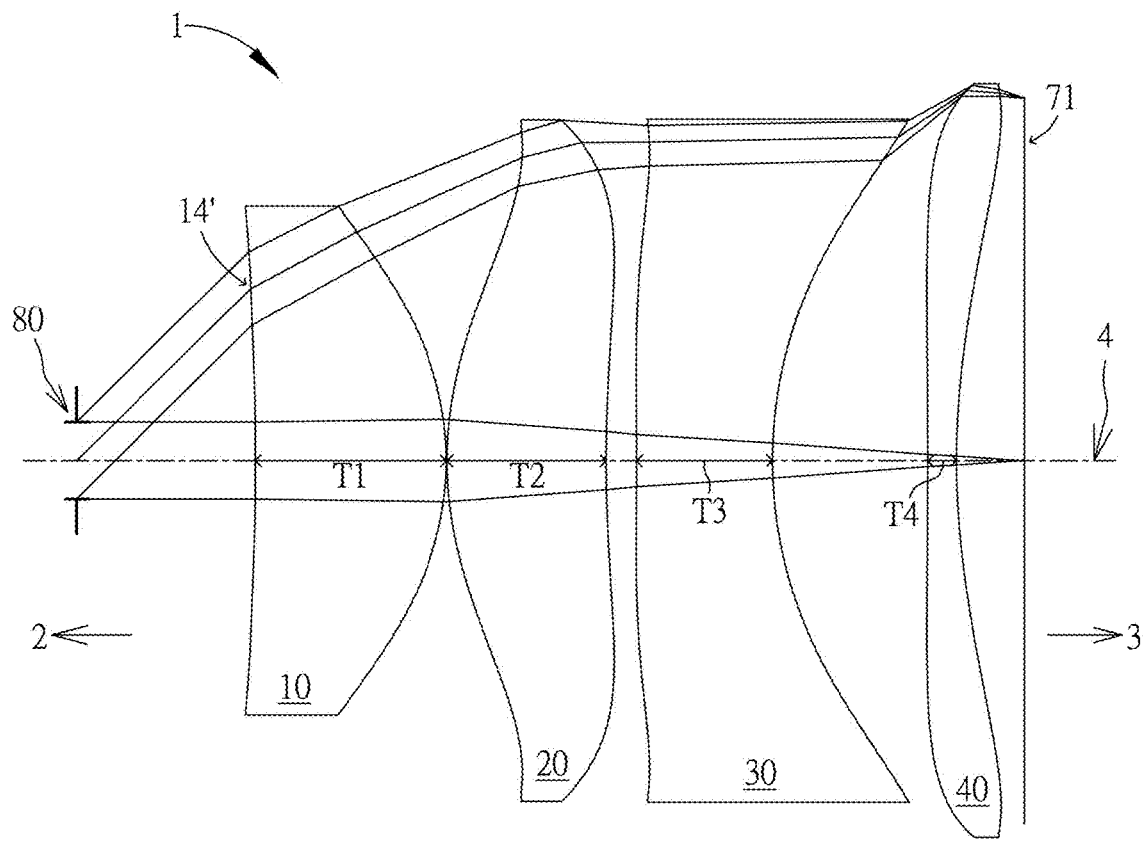
FIG. 11 illustrates a third example of the ocular optical system of four lens elements of the present invention.
Figures 12A, 12B, 12C, 12D:
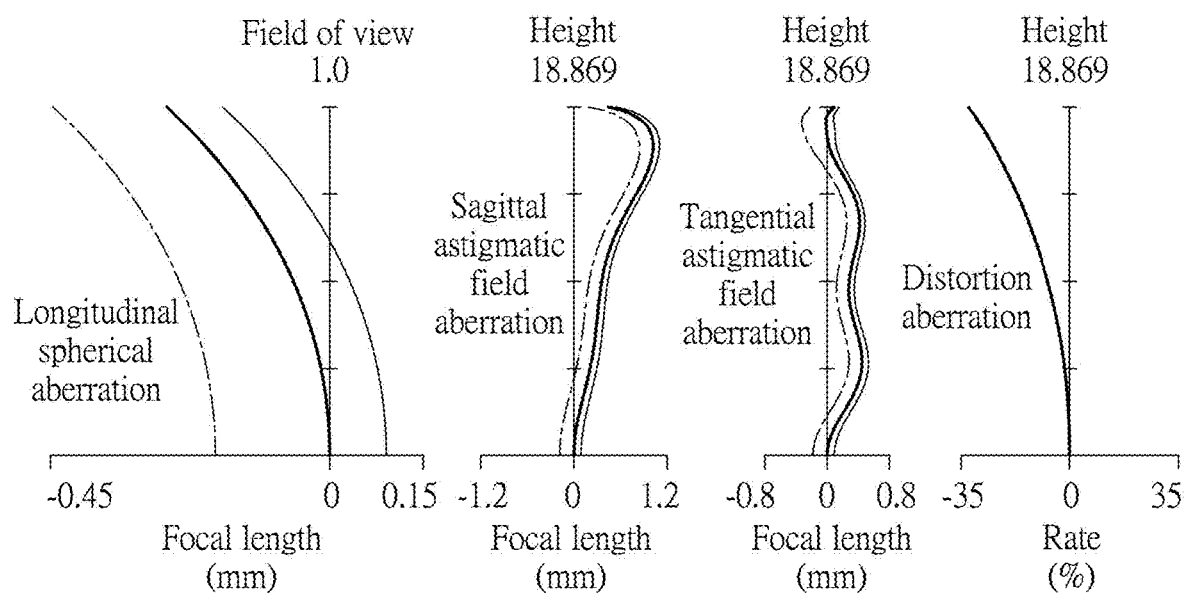
FIG. 12A illustrates the longitudinal spherical aberration on the image plane of the third example.
FIG. 12B illustrates the astigmatic aberration on the sagittal direction of the third example.
FIG. 12C illustrates the astigmatic aberration on the tangential direction of the third example.
FIG. 12D illustrates the distortion aberration of the third example.

Please refer to FIG. 11 which illustrates the third example of the ocular optical system 1 of the present invention. Please refer to FIG. 12A for the longitudinal spherical aberration on the display screen 71 of the third example; please refer to FIG. 12B for the astigmatic aberration on the sagittal direction; please refer to FIG. 12C for the astigmatic aberration on the tangential direction, and please refer to FIG. 12D for the distortion aberration. The components in the third example are similar to those in the first example, but the optical data such as the curvature radius, the refractive power, the lens thickness, the lens focal length, the aspheric surface or the back focal length in this example are different from the optical data in the first example, and in this example, the eye-side surface 11 facing toward the eye side 2 of the first lens 10 has a concave part 14' in a vicinity of its periphery.

The optical data of the third example of the ocular optical system are shown in FIG. 27 while the aspheric surface data are shown in FIG. 28. EFL is 28.0126 mm. ω is 45.0020 degrees. TTL is 40.0337 mm. Fno is 6.9568. The image height is 18.869 mm. In particular, 1) SL of the third example is shorter than that of the first example of the present invention, 2) the astigmatic aberration on the tangential direction of the third example is better than that of the first example of the present invention.

Fourth Example

Figure 13:
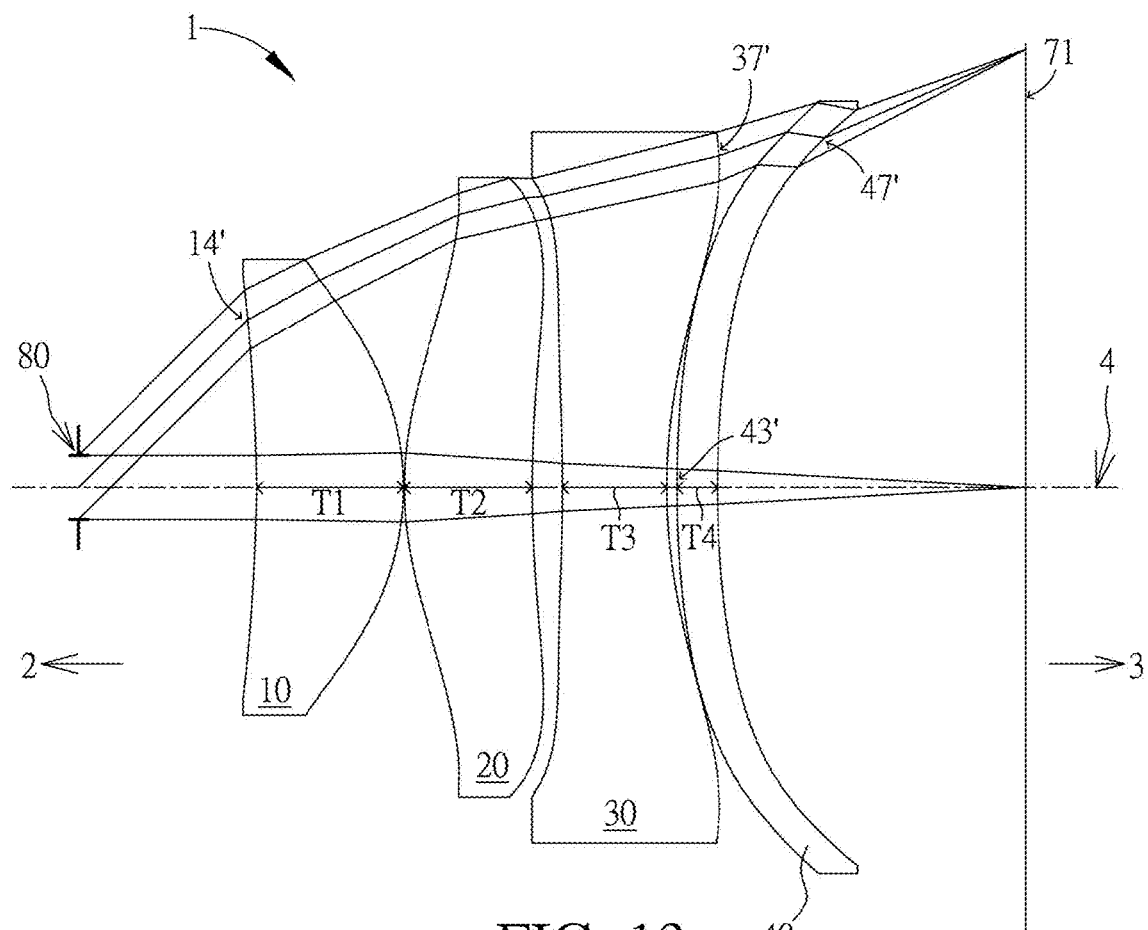
FIG. 13 illustrates a fourth example of the ocular optical system of four lens elements of the present invention.
Figures 14A, 14B, 14C, 14D:
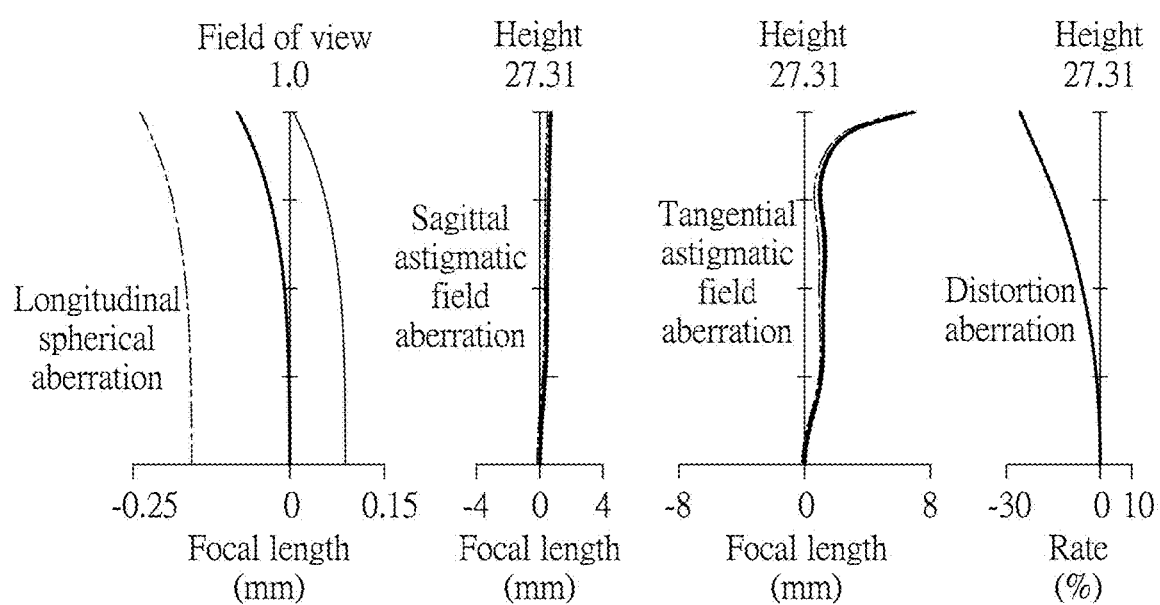
FIG. 14A illustrates the longitudinal spherical aberration on the image plane of the fourth example.
FIG. 14B illustrates the astigmatic aberration on the sagittal direction of the fourth example.
FIG. 14C illustrates the astigmatic aberration on the tangential direction of the fourth example.
FIG. 14D illustrates the distortion aberration of the fourth example.

Please refer to FIG. 13 which illustrates the fourth example of the ocular optical system 1 of the present invention. Please refer to FIG. 14A for the longitudinal spherical aberration on the display screen 71 of the fourth example; please refer to FIG. 14B for the astigmatic aberration on the sagittal direction; please refer to FIG. 14C for the astigmatic aberration on the tangential direction, and please refer to FIG. 14D for the distortion aberration. The components in the fourth example are similar to those in the first example, but the optical data such as the curvature radius, the refractive power, the lens thickness, the lens focal length, the aspheric surface or the back focal length in this example are different from the optical data in the first example, and in this example, the eye-side surface 11 facing toward the eye side 2 of the first lens element 10 has a concave part 14' in a vicinity of its periphery, the display-side surface 32 facing toward the display side 3 of the third lens element 30 has a convex part 37' in a vicinity of its periphery, the eye-side surface 41 facing toward the eye side 2 of the fourth lens element 40 has a convex part 43' in the vicinity of the optical axis and the display-side surface 42 facing toward the display side 3 of the forth lens element 40 has a concave part 47' in a vicinity of its periphery.

The optical data of the fourth example of the ocular optical system are shown in FIG. 29 while the aspheric surface data are shown in FIG. 30. EFL is 36.7209 mm. ω is 45.0004 degrees. TTL is 47.9270 mm. Fno is 9.2018. The image height is 27.31 mm.

Fifth Example

Figure 15:
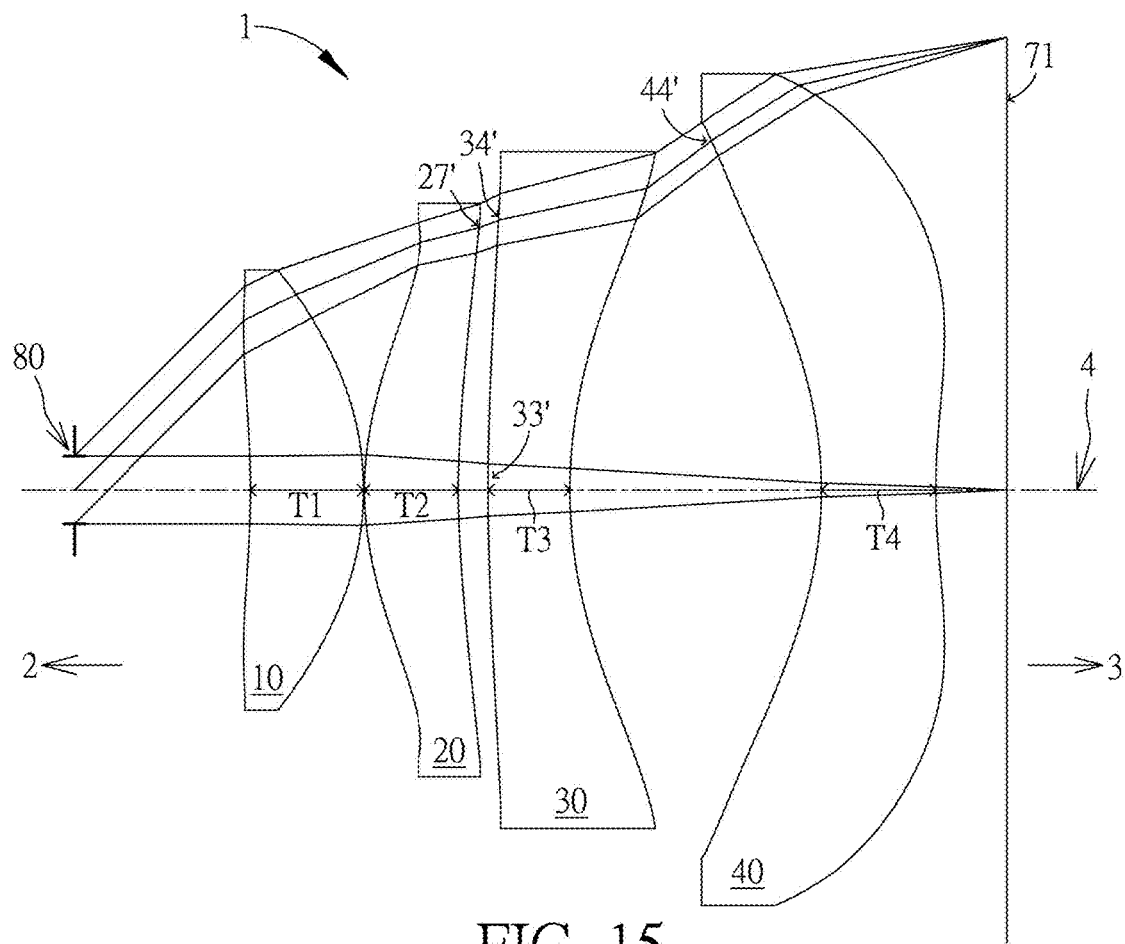
FIG. 15 illustrates a fifth example of the ocular optical system of four lens elements of the present invention.
Figures 16A, 16B, 16C, 16D:
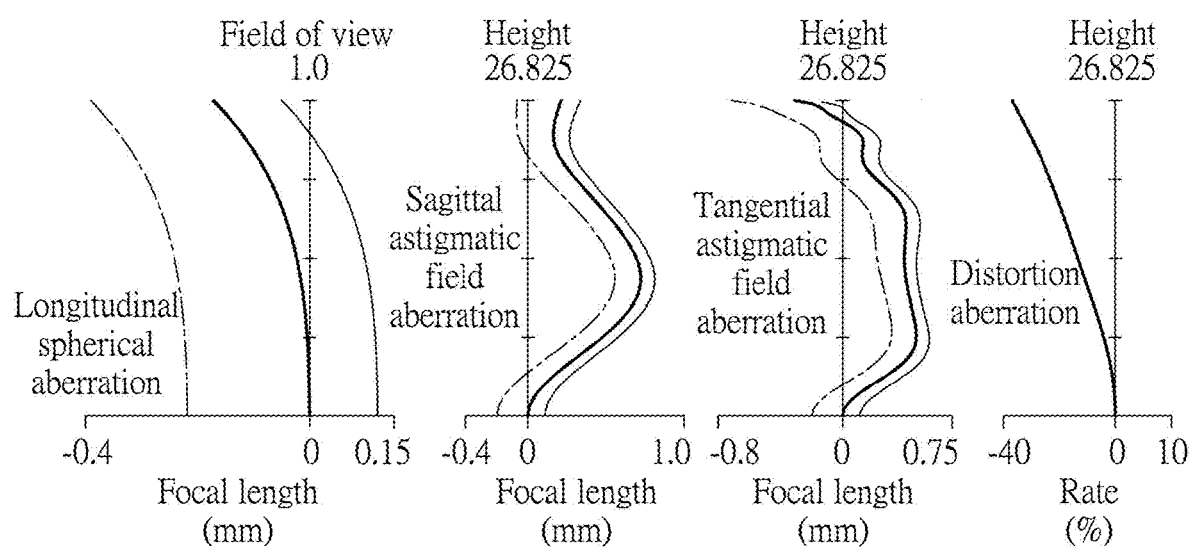
FIG. 16A illustrates the longitudinal spherical aberration on the image plane of the fifth example.
FIG. 16B illustrates the astigmatic aberration on the sagittal direction of the fifth example.
FIG. 16C illustrates the astigmatic aberration on the tangential direction of the fifth example.
FIG. 16D illustrates the distortion aberration of the fifth example.

Please refer to FIG. 15 which illustrates the fifth example of the ocular optical system 1 of the present invention. Please refer to FIG. 16A for the longitudinal spherical aberration on the display screen 71 of the fifth example; please refer to FIG. 16B for the astigmatic aberration on the sagittal direction; please refer to FIG. 16C for the astigmatic aberration on the tangential direction, and please refer to FIG. 16D for the distortion aberration. The components in the fifth example are similar to those in the first example, but the optical data such as the curvature radius, the refractive power, the lens thickness, the lens focal length, the aspheric surface or the back focal length in this example are different from the optical data in the first example, and in this example, the display-side surface 22 facing toward the display side 3 of the second lens element 20 has a concave part 27' in a vicinity of its periphery, the eye-side surface 31 facing toward the eye side 2 of the third lens element 30 has a convex part 33' in the vicinity of the optical axis and a convex part 34' in a vicinity of its periphery, the eye-side surface 41 facing toward the eye side 2 of the fourth lens element 40 has a concave part 44' in a vicinity of its periphery.

The optical data of the fifth example of the ocular optical system are shown in FIG. 31 while the aspheric surface data are shown in FIG. 32. EFL is 42.4611 mm. ω is 45.0003 degrees. TTL is 44.7710 mm. Fno is 10.5796. The image height is 26.825 mm. In particular, 1) SL of the fifth example is shorter than that of the first example of the present invention, 2) the astigmatic aberration on the tangential direction of the fifth example is better than that of the first example of the present invention.

Sixth Example

Figure 17:
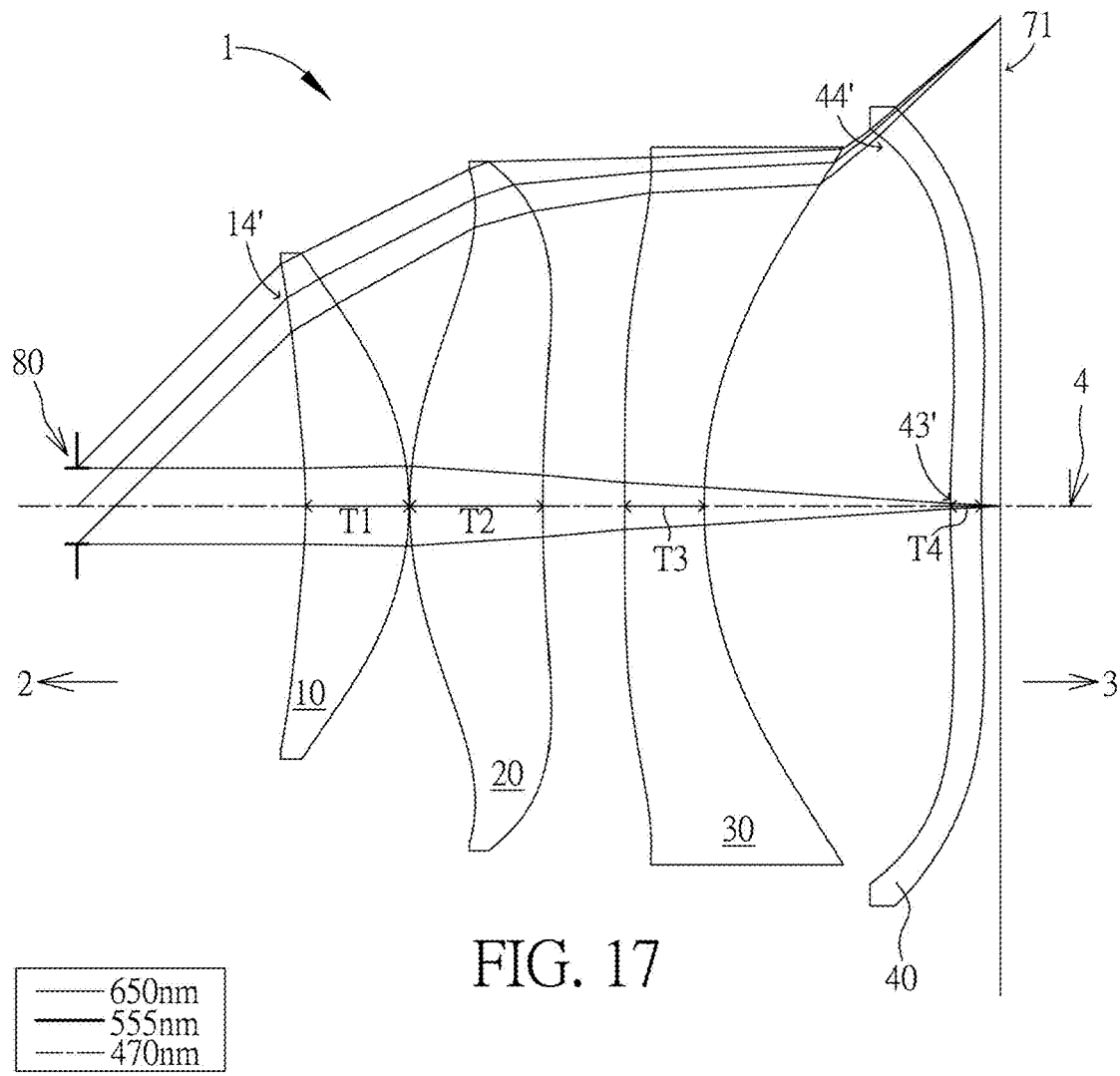
FIG. 17 illustrates a sixth example of the ocular optical system of four lens elements of the present invention.
Figures 18A, 18B, 18C, 18D:
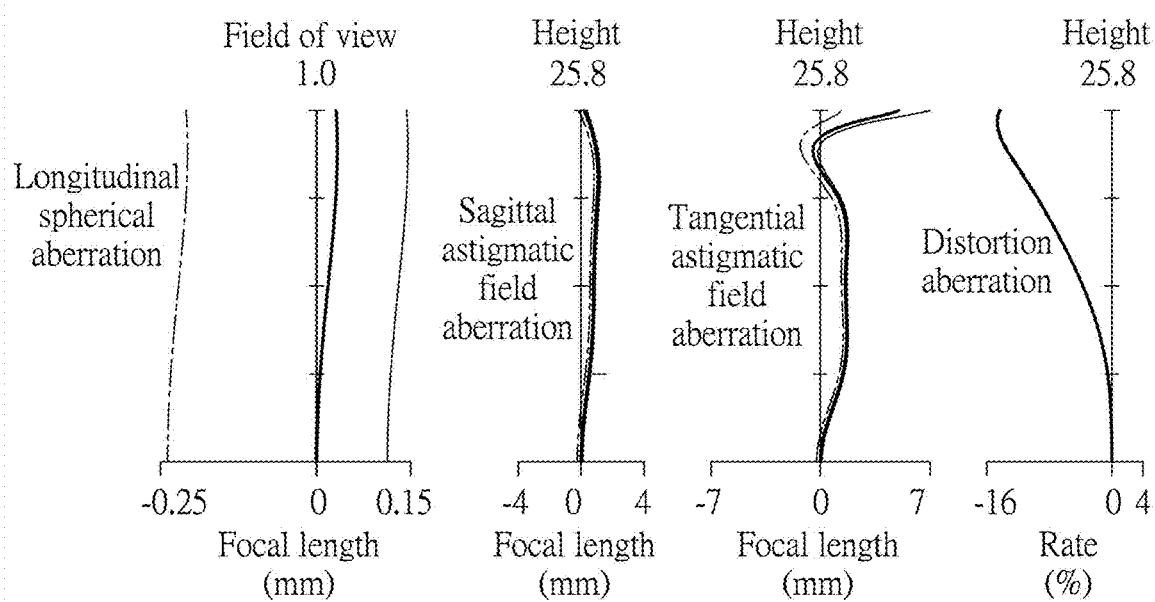
FIG. 18A illustrates the longitudinal spherical aberration on the image plane of the sixth example.
FIG. 18B illustrates the astigmatic aberration on the sagittal direction of the sixth example.
FIG. 18C illustrates the astigmatic aberration on the tangential direction of the sixth example.
FIG. 18D illustrates the distortion aberration of the sixth example.

Please refer to FIG. 17 which illustrates the sixth example of the ocular optical system 1 of the present invention. Please refer to FIG. 18A for the longitudinal spherical aberration on the display screen 71 of the sixth example;

please refer to FIG. 18B for the astigmatic aberration on the sagittal direction; please refer to FIG. 18C for the astigmatic aberration on the tangential direction, and please refer to FIG. 18D for the distortion aberration. The components in the sixth example are similar to those in the first example, but the optical data such as the curvature radius, the refractive power, the lens thickness, the lens focal length, the aspheric surface or the back focal length in this example are different from the optical data in the first example, and in this example, the eye-side surface 11 facing toward the eye side 2 of the first lens element 10 has a concave part 14' in a vicinity of its periphery, the eye-side surface 41 facing toward the eye side 2 of the fourth lens element 40 has a convex part 43' in the vicinity of the optical axis, the eye-side surface 41 facing toward the eye side 2 of the fourth lens element 40 has a concave part 44' in a vicinity of its periphery.

The optical data of the sixth example of the ocular optical system are shown in FIG. 33 while the aspheric surface data are shown in FIG. 34. EFL is 30.1295 mm. ω is 44.9997 degrees. TTL is 36.4973 mm. Fno is 7.5894. The image height is 25.8 mm. In particular, SL of the sixth example is shorter than that of the first example of the present invention.

Seventh Example

Figure 19:
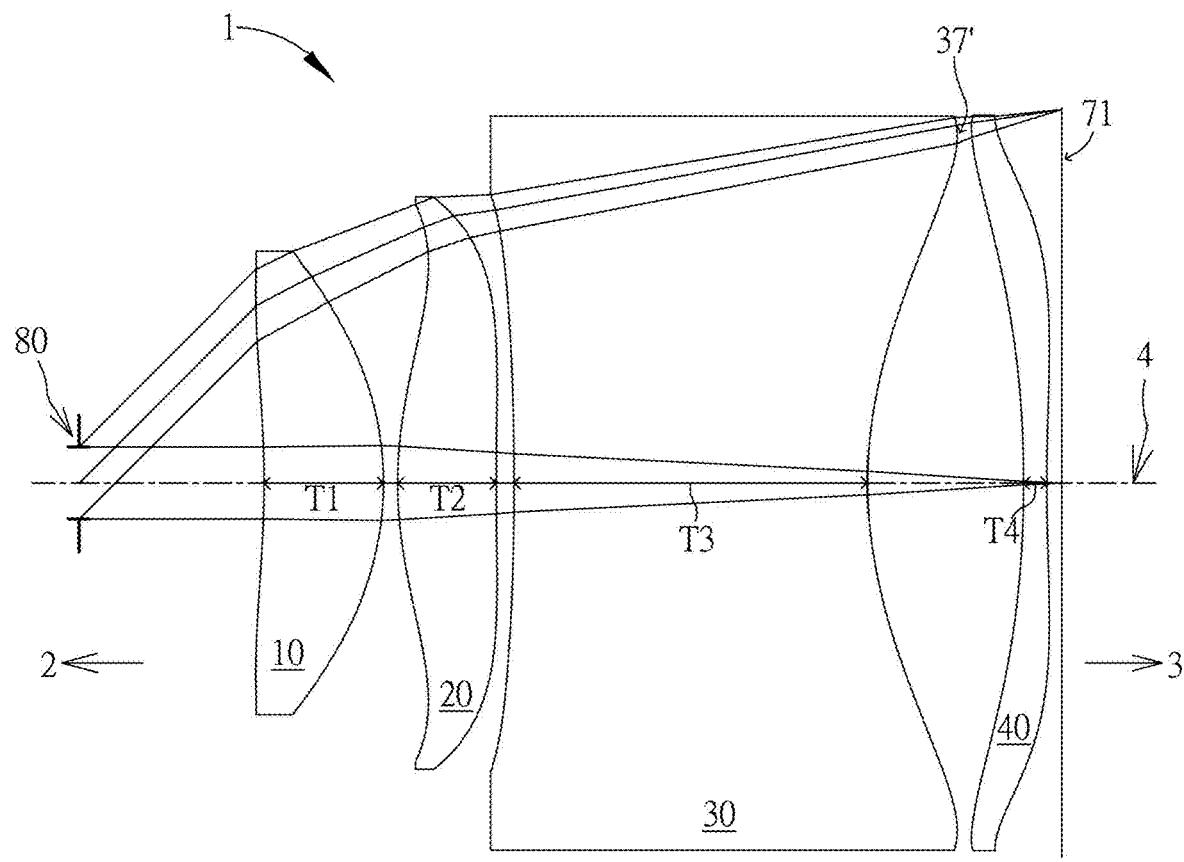
FIG. 19 illustrates a seventh example of the ocular optical system of four lens elements of the present invention.
Figures 20A, 20B, 20C, 20D:
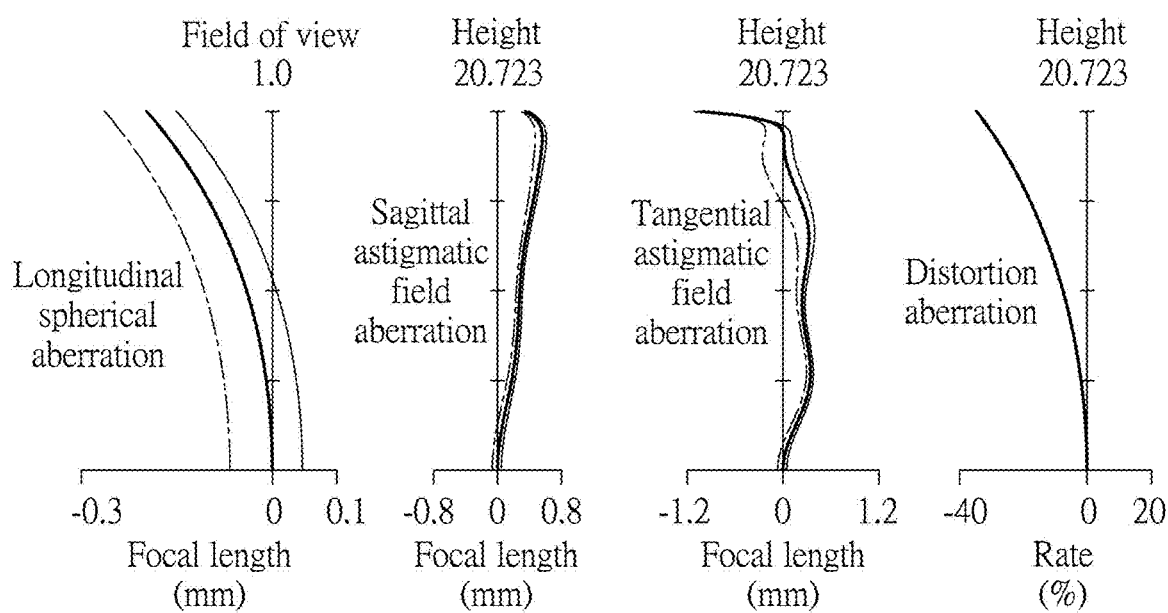
FIG. 20A illustrates the longitudinal spherical aberration on the image plane of the seventh example.
FIG. 20B illustrates the astigmatic aberration on the sagittal direction of the seventh example.
FIG. 20C illustrates the astigmatic aberration on the tangential direction of the seventh example.
FIG. 20D illustrates the distortion aberration of the seventh example.

Please refer to FIG. 19 which illustrates the seventh example of the ocular optical system 1 of the present invention. Please refer to FIG. 20A for the longitudinal spherical aberration on the display screen 71 of the seventh example; please refer to FIG. 20B for the astigmatic aberration on the sagittal direction; please refer to FIG. 20C for the astigmatic aberration on the tangential direction, and please refer to FIG. 20D for the distortion aberration. The components in the seventh example are similar to those in the first example, but the optical data such as the curvature radius, the refractive power, the lens thickness, the lens focal length, the aspheric surface or the back focal length in this example are different from the optical data in the first example, and in this example, the display-side surface 32 facing toward the display side 3 of the third lens element 30 has a convex part 37' in a vicinity of its periphery.

The optical data of the seventh example of the ocular optical system are shown in FIG. 35 while the aspheric surface data are shown in FIG. 36. EFL is 31.6870 mm. ω is 45.0031 degrees. TTL is 44.1791 mm. Fno is 7.8787. The image height is 20.723 mm. In particular, 1) SL of the seventh example is shorter than that of the first example of the present invention, 2) the ω of the seventh example is larger than that of the first example of the present invention.

Eighth Example

Figure 21:
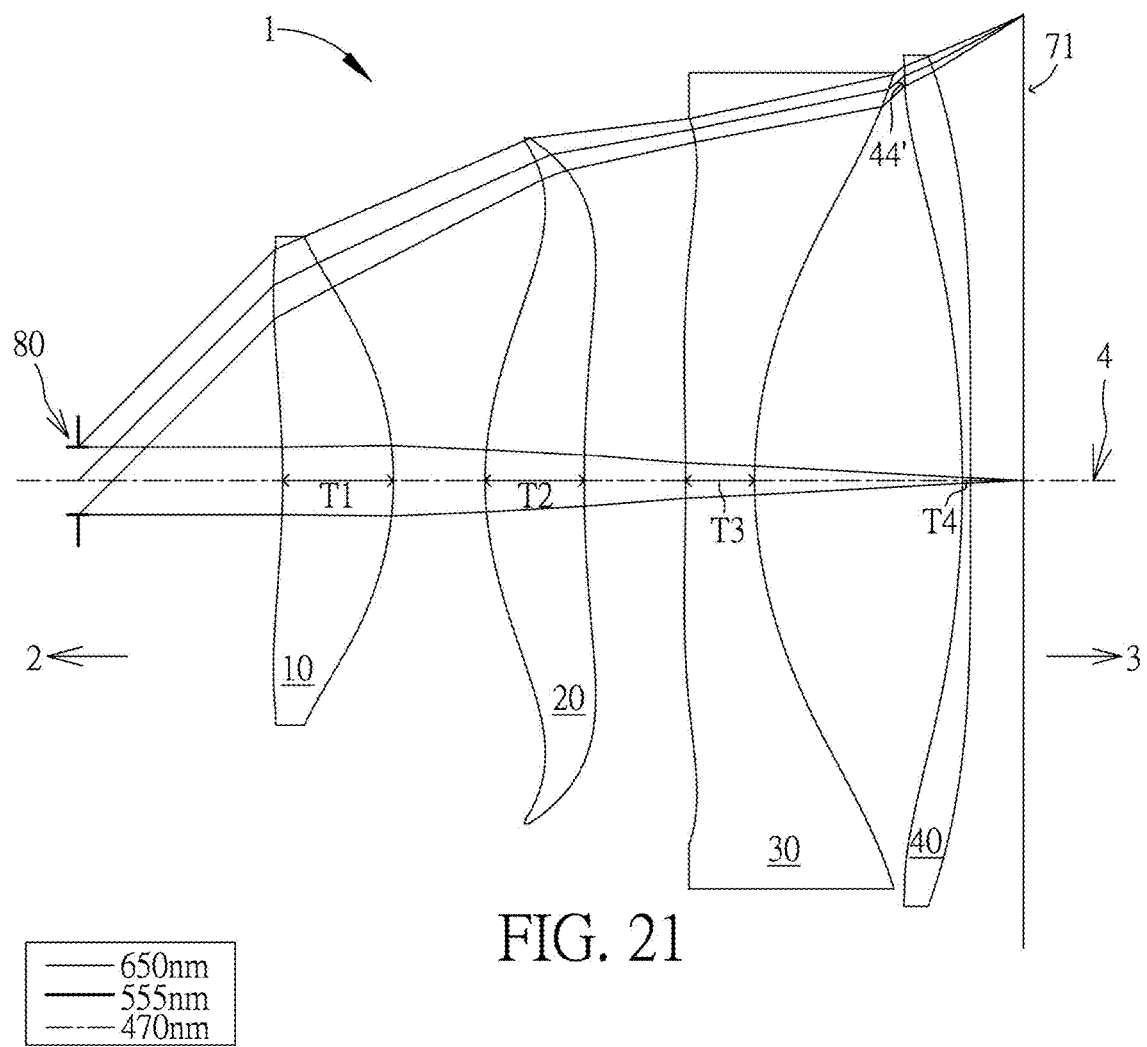
FIG. 21 illustrates an eighth example of the ocular optical system of four lens elements of the present invention.
Figures 22A, 22B, 22C, 22D:
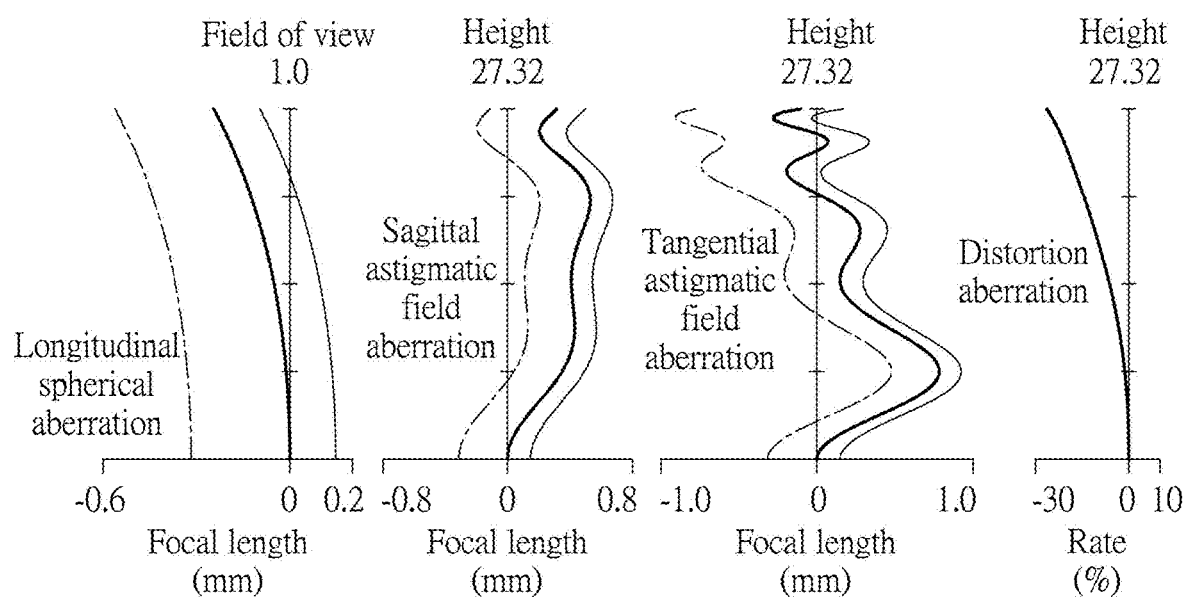
FIG. 22A illustrates the longitudinal spherical aberration on the image plane of the eighth example.
FIG. 22B illustrates the astigmatic aberration on the sagittal direction of the eighth example.
FIG. 22C illustrates the astigmatic aberration on the tangential direction of the eighth example.
FIG. 22D illustrates the distortion aberration of the eighth example.

Please refer to FIG. 21 which illustrates the eighth example of the ocular optical system 1 of the present invention. Please refer to FIG. 22A for the longitudinal spherical aberration on the display screen 71 of the eighth example; please refer to FIG. 22B for the astigmatic aberration on the sagittal direction; please refer to FIG. 22C for the astigmatic aberration on the tangential direction, and please refer to FIG. 22D for the distortion aberration. The components in the eighth example are similar to those in the first example, but the optical data such as the curvature radius, the refractive power, the lens thickness, the lens focal length, the aspheric surface or the back focal length in this example are different from the optical data in the first example, and in this example, the eye-side surface 41 facing toward the eye side 2 of the fourth lens element 40 has a concave part 44' in a vicinity of its periphery.

The optical data of the eighth example of the ocular optical system are shown in FIG. 37 while the aspheric surface data are shown in FIG. 38. EFL is 37.0412 mm. ω is 45.0013 degrees. TTL is 43.4587 mm. Fno is 9.2224. The image height is 27.32 mm. In particular, 1) SL of the eighth example is shorter than that of the first example of the present invention, 2) the ω of the eighth example is larger than that of the first example of the present invention.

Besides, some important ratios in each example are shown in FIG. 39.

In light of the above examples, the inventors observe at least the following features:

1. The eye-side surface 21 facing toward the eye side 2 of the second lens element 20 with a concave part 24 in a vicinity of its periphery along with the display-side surface 42 facing toward the display side 3 of the fourth lens element 40 with a concave part 46 in the vicinity of the optical axis facilitate the magnification of the images. The optional negative refractive power of the third lens element 30, the convex part 17 facing toward the display side 3 of the first lens element 10 in a vicinity of its periphery, the positive refractive power of the second lens element 20 or the concave part 36 facing toward the display side 3 of the display-side surface 32 in the vicinity of the optical axis are able to effectively improve the total parallaxis and to enhance the imaging quality.

2. 250 mm is an optimal visual distance, namely the closest distance allowing the eye can focus clearly for young people. The magnifying ratio of the system can approximate the ratio of 250 mm over EFL. When it satisfies 3≤250 mm/EFL≤15, the magnifying ratio of the system is not so large to increase the thickness of the lens elements or make the ocular optical system difficult to fabricate, and at the same time EFL is not so long to jeopardize the length of the ocular optical system.

3. The condition of 40°≤ω makes the viewer not feel a restricted viewing range. It is preferably 40°≤ω≤60° so that the design of the ocular optical system is less difficult.

The following conditions suggest good ratios which help control the lens thickness or the air gaps to maintain a suitable range and keeps a lens element from being too thick to facilitate the reduction of the overall size or too thin to assemble the optical imaging lens set.

1. G34/(G12+G23)≤10.9. It is preferably 0≤G34/(G12+G23)≤10.9.
2. AAG/(G21+G23)≤11.9. It is preferably 1.0≤AAG/(G12+G23)≤11.9.
3. ALT/T1≤5. It is preferably 1.8≤ALT/T1≤5.
4. AAG/T1≤3.7. It is preferably 0.03≤AAG/T1≤3.7.
5. T1/T2≤1.3. It is preferably 0.2≤T1/T2≤1.3.
6. TTL/T1≤10.7. It is preferably 2.2≤TTL/T1≤10.7.
7. 0≤TL/ER≤5.2.
8. 0.8≤ER/T4≤20.
9. 0≤TTL/(ER+G12)≤6.
10. 0≤(TTL+G4D)/ER≤10.

The following conditions suggest good ratios which help control the focal length of the system and each optical parameter to maintain a suitable range and keep any parameter from being too large to facilitate the correction of the overall parallaxis of the ocular optical system or from being too small to assemble the ocular optical system or to facilitate the fabrication.

1. EFL/ER≤4.1. It is preferably 0.8≤EFL/ER≤4.1.

The following conditions suggest good ratios which help maintain the eye relief and each optical parameter within a suitable range and keep any parameter from being too large to facilitate the viewer's comfort due to the distance from the ocular optical system to an eye too far away or too close or from being too small to assemble the ocular optical system or to facilitate the fabrication.
1. ALT/ER≤3.4. It is preferably 0.4≤ALT/ER≤3.4.
2. TTL/ER≤4.4. It is preferably 1.3≤TTL/ER≤4.4.
3. SL/ER≤5.4. It is preferably 2.3≤SL/ER≤5.4.

The following conditions suggest good ratios which help maintain the length of the ocular optical system and optical parameters within a suitable range and keep any parameter from being too large to facilitate the reduction of the length of the ocular optical system or from being too small to assemble the ocular optical system or to facilitate the fabrication.
1. SL/ER≤5.4. It is preferably 2.3≤SL/ER≤5.4.
2. SL/(G12+G23)≤30.7. It is preferably 2.5≤SL/(G12+G23)≤30.7.

By limiting the relationships between the lens thickness of the third lens element and the thickness of other lens elements in the ocular optical system or the thickness of the air gaps, T3 is kept from being so large or so small to facilitate the reduction of the parallaxis which is caused by the first lens element or by the second lens element.
1. T3/(G12+G23)≤16.5. It is preferably 0.02≤T3/(G12+G23)≤16.5.
2. (T1+G45)/(G23+T3)≤3.6. It is preferably 0.3≤(T1+G45)/(G23+T3)≤3.6.
3. T1/T3≤1.6. It is preferably 0.3≤T1/T3≤1.6.

By limiting the relationships between the lens thickness of the fourth lens element and the thickness of other lens elements in the ocular optical system or the thickness of the air gaps, the T4 is kept from being so large or so small to facilitate the reduction of the parallaxis which is caused by the first lens element to the third lens element.
1. T4/T1≤1.6. It is preferably 0.07≤T4/T1≤1.6.
2. T4/(G12+G23)≤6.4. It is preferably 0.01≤T4/(G12+G23)≤6.4.

The above-mentioned one or more conditions may be properly combined in the embodiments to increase the limitations of the ocular optical system to facilitate the design of systems of similar construction like the present invention. In the light of the unpredictability of the design of the optical system, the present invention suggests the above principles to have a shorter total length of the optical system, a larger half apparent field available, better imaging quality or a better fabrication yield to overcome the drawbacks of prior art.

The above limitations may be properly combined at the discretion of persons who practice the present invention and they are not limited as shown above. In addition to the above ratios, the curvatures of each lens element or multiple lens elements may be fine-tuned to result in more fine structures to enhance the performance or the resolution. For example, the object-side surface of the first lens element may additionally have a convex part in the vicinity of the optical axis. The above limitations may be properly combined in the embodiments without causing inconsistency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An ocular optical system, applied to imaging rays from a display screen into an observer's eye via said ocular optical system, with an eye side facing toward said observer's eye and with a display side facing toward said display screen, said ocular optical system from said eye side toward said display side in order along an optical axis comprising: a first lens element, a second lens element, a third lens element and a fourth lens element, said first lens element to said fourth lens element each having an eye-side surface facing toward said eye side and a display-side surface facing toward said display side, wherein:

said second lens element has an eye-side surface with a concave portion in a vicinity of its periphery;
said third lens element has negative refractive power; and
said fourth lens element has a display-side surface with a concave portion in a vicinity of said optical-axis and lens elements having refractive power of the ocular optical system consist only of the four lens elements described above.

2. The ocular optical system of claim 1, wherein ALT is a total thickness of all four lens elements and ER is a distance between a pupil of said observer and said first lens element to satisfy ALT/ER≤3.4.

3. The ocular optical system of claim 1, wherein G12 is an air gap between said first lens element and said second lens element along said optical axis, G23 is an air gap between said second lens element and said third lens element along said optical axis and G34 is an air gap between said third lens element and said fourth lens element along said optical axis to satisfy G34/(G12+G23)≤10.9.

4. The ocular optical system of claim 1, wherein AAG is a sum of all three air gaps between each lens elements from said first lens element to said fourth lens element along said optical axis, G12 is an air gap between said first lens element and said second lens element along said optical axis and G23 is an air gap between said second lens element and said third lens element along said optical axis to satisfy AAG/(G12+G23)≤11.9.

5. The ocular optical system of claim 1, wherein TTL is a distance between an eye-side surface of said first lens element and said display screen and ER is a distance between a pupil of said observer and said first lens element to satisfy TTL/ER≤4.4.

6. The ocular optical system of claim 1, wherein T1 is a thickness of said first lens element along said optical axis and T4 is a thickness of said fourth lens element along said optical axis to satisfy T4/T1≤1.6.

7. The ocular optical system of claim 1, wherein SL is a distance between a pupil of said observer and said display screen and ER is a distance between a pupil of said observer to an eye-side surface of said first lens element to satisfy SL/ER≤5.4.

8. The ocular optical system of claim 1, wherein EFL is an effective focal length of said ocular optical system to satisfy 3≤250 mm/EFL≤15.

9. An ocular optical system, applied to imaging rays from a display screen into an observer's eye via said ocular optical system, with an eye side facing toward said observer's eye and with a display side facing toward said display screen, said ocular optical system from said eye side toward said display side in order along an optical axis comprising: a first lens element, a second lens element, a third lens element and a fourth lens element, said first lens element to said fourth lens element each having an eye-side surface facing toward said eye side and a display-side surface facing toward said display side, wherein:

said first lens element has a display-side surface with a convex portion in a vicinity of its periphery;

said second lens element has positive refractive power, a display-side surface with a concave portion in a vicinity of said optical axis and an eye-side surface with a concave portion in a vicinity of its periphery; and said fourth lens element has a display-side surface with a concave portion in a vicinity of said optical-axis and lens elements having refractive power of the ocular optical system consist only of the four lens elements described above.

10. The ocular optical system of claim 9, wherein T4 is a thickness of said fourth lens element along said optical axis, G12 is an air gap between said first lens element and said second lens element along said optical axis and G23 is an air gap between said second lens element and said third lens element along said optical axis to satisfy T4/(G12+G23) ≤6.4.

11. The ocular optical system of claim 9, wherein ALT is a total thickness of all four lens elements and T1 is a thickness of said first lens element along said optical axis to satisfy ALT/T1≤5.

12. The ocular optical system of claim 9, wherein AAG is a sum of all three air gaps between each lens elements from said first lens element to said fourth lens element along said optical axis and T1 is a thickness of said first lens element along said optical axis to satisfy AAG/T1≤3.7.

13. The ocular optical system of claim 9, wherein EFL is an effective focal length of said ocular optical system and ER is a distance between a pupil of said observer to an eye-side surface of said first lens element to satisfy EFL/ER≤4.1.

14. The ocular optical system of claim 9, wherein T3 is a thickness of said third lens element along said optical axis, G12 is an air gap between said first lens element and said second lens element along said optical axis and G23 is an air gap between said second lens element and said third lens element along said optical axis to satisfy T3/(G12+G23) ≤16.5.

15. An ocular optical system, applied to imaging rays from a display screen into an observer's eye via said ocular optical system, with an eye side facing toward said observer's eye and with a display side facing toward said display screen, said ocular optical system from said eye side toward said display side in order along an optical axis comprising: a first lens element, a second lens element, a third lens element and a fourth lens element, said first lens element to said fourth lens element each having an eye-side surface facing toward said eye side and a display-side surface facing toward said display side, wherein:

said second lens element has an eye-side surface with a concave portion in a vicinity of its periphery;

said third lens element has a display-side surface with a concave portion in a vicinity of said optical-axis; and said fourth lens element has a display-side surface with a concave portion in a vicinity of said optical-axis and lens elements having refractive power of the ocular optical system consist only of the four lens elements described above.

16. The ocular optical system of claim 15, wherein SL is a distance between a pupil of said observer and said display screen, G12 is an air gap between said first lens element and said second lens element along said optical axis and G23 is an air gap between said second lens element and said third lens element along said optical axis to satisfy SL/(G12+G23)≤30.7.

17. The ocular optical system of claim 15, wherein T1 is a thickness of said first lens element along said optical axis, T3 is a thickness of said third lens element along said optical axis, G23 is an air gap between said second lens element and said third lens element along said optical axis and G4D is a distance between said fourth lens element and said display screen along said optical axis to satisfy (T1+G4D)/(G23+T3)≤3.6.

18. The ocular optical system of claim 15, wherein T1 is a thickness of said first lens element along said optical axis and T2 is a thickness of said second lens element along said optical axis to satisfy T1/T2≤1.3.

19. The ocular optical system of claim 15, wherein T1 is a thickness of said first lens element along said optical axis and T3 is a thickness of said third lens element along said optical axis to satisfy T1/T3≤1.6.

20. The ocular optical system of claim 15, wherein TTL is a distance between an eye-side surface of said first lens element and said display screen and T1 is a thickness of said first lens element along said optical axis to satisfy TTL/T1≤10.7.

* * * * *